(12) United States Patent
Sugimoto

(10) Patent No.: US 8,755,068 B2
(45) Date of Patent: Jun. 17, 2014

(54) IMAGE PROCESSING DEVICE WITH EXECUTABLE HARDWARE KEY AND SERVER

(75) Inventor: Tetsuya Sugimoto, Muko (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1021 days.

(21) Appl. No.: 12/548,559

(22) Filed: Aug. 27, 2009

(65) Prior Publication Data

US 2010/0053676 A1 Mar. 4, 2010

(30) Foreign Application Priority Data

Aug. 29, 2008 (JP) ................................. 2008-221151

(51) Int. Cl.
*G06F 3/12* (2006.01)
(52) U.S. Cl.
USPC .......... 358/1.15; 358/1.1; 358/1.14; 358/501; 358/401; 715/700; 380/277; 345/156
(58) Field of Classification Search
CPC .............. H04N 2201/0089; H04N 2201/0082; H04N 2201/0091; H04N 2201/0094; H04L 9/10
See application file for complete search history.

(56) References Cited

U.S. PATENT DOCUMENTS

| | | | | |
|---|---|---|---|---|
| 7,911,626 B2* | 3/2011 | Ferlitsch | ...................... | 358/1.13 |
| 8,279,476 B2* | 10/2012 | Kimura | ......................... | 358/1.15 |
| 8,375,210 B2* | 2/2013 | Miller | ........................... | 713/168 |
| 8,457,310 B2* | 6/2013 | Uchikawa et al. | .............. | 380/51 |
| 2005/0105129 A1 | 5/2005 | Takahashi | | |
| 2005/0206973 A1* | 9/2005 | Shoji et al. | .................... | 358/500 |
| 2006/0077423 A1 | 4/2006 | Mathieson et al. | | |
| 2008/0013129 A1* | 1/2008 | Sato | .............................. | 358/405 |
| 2008/0074693 A1* | 3/2008 | Hashimoto et al. | .......... | 358/1.15 |
| 2009/0296131 A1* | 12/2009 | Yoshida et al. | .............. | 358/1.15 |

FOREIGN PATENT DOCUMENTS

| | | |
|---|---|---|
| JP | 2001-350681 A | 12/2001 |
| JP | 2005-011146 A | 1/2005 |
| JP | 2005-167988 A | 6/2005 |
| JP | 2006-127503 A | 5/2006 |

OTHER PUBLICATIONS

Office Action (Notification of Reason(s) for Refusal) dated Jun. 29, 2010, issued in the corresponding Japanese Patent Application No. 2008-221151, and an English Translation thereof. (4 pages).
[IE 5] ime-mode: disabled is not enabled, Dec. 1, 1999. http://support.microsoft.com/kb/414672/ja, (3 pages).

* cited by examiner

*Primary Examiner* — Hilina K Demeter
(74) *Attorney, Agent, or Firm* — Buchanan Ingersoll Rooney PC

(57) ABSTRACT

An image processing device including a communication interface unit; a user interface display unit which provides information to a user; a user interface input unit having a hardware key which receives an input from the user; a web-browser section which receives page data from a web server, structures a display screen on the user interface display unit based on the page data, and displays the display screen on the user interface display unit; a data analysis section which determines whether an operation on the hardware key is to be valid or invalid based on the page data; and a hardware-key control section which controls validity/invalidity of the operation on the hardware key based on the determination made by the data analysis section.

18 Claims, 23 Drawing Sheets

| CONTENTS OF DESCRIPTIONS OF COMMENTS | | CONTROL OPERATION |
|---|---|---|
| TYPE OF HARD KEY | STATE | |
| START KEY | VALID | MAKING START KEY VALID |
| START KEY | INVALID | MAKING START KEY INVALID |
| INTERRUPT KEY | VALID | MAKING INTERRUPT KEY VALID |
| INTERRUPT KEY | INVALID | MAKING INTERRUPT KEY INVALID |
| SETTING KEY | VALID | MAKING SETTING KEY VALID |
| SETTING KEY | INVALID | MAKING SETTING KEY INVALID |

*Fig.13*

| CONTENTS OF DESCRIPTIONS RELATING TO RENDERING | | CONTROL OPERATION |
|---|---|---|
| BUTTON NAME | COLOR OF A DISPLAYED BUTTON | |
| START KEY | GREEN | MAKING START KEY VALID |
| START KEY | RED | MAKING START KEY INVALID |
| INTERRUPT KEY | GREEN | MAKING INTERRUPT KEY VALID |
| INTERRUPT KEY | RED | MAKING INTERRUPT KEY INVALID |
| SETTING KEY | GREEN | MAKING SETTING KEY VALID |
| SETTING KEY | RED | MAKING SETTING KEY INVALID |

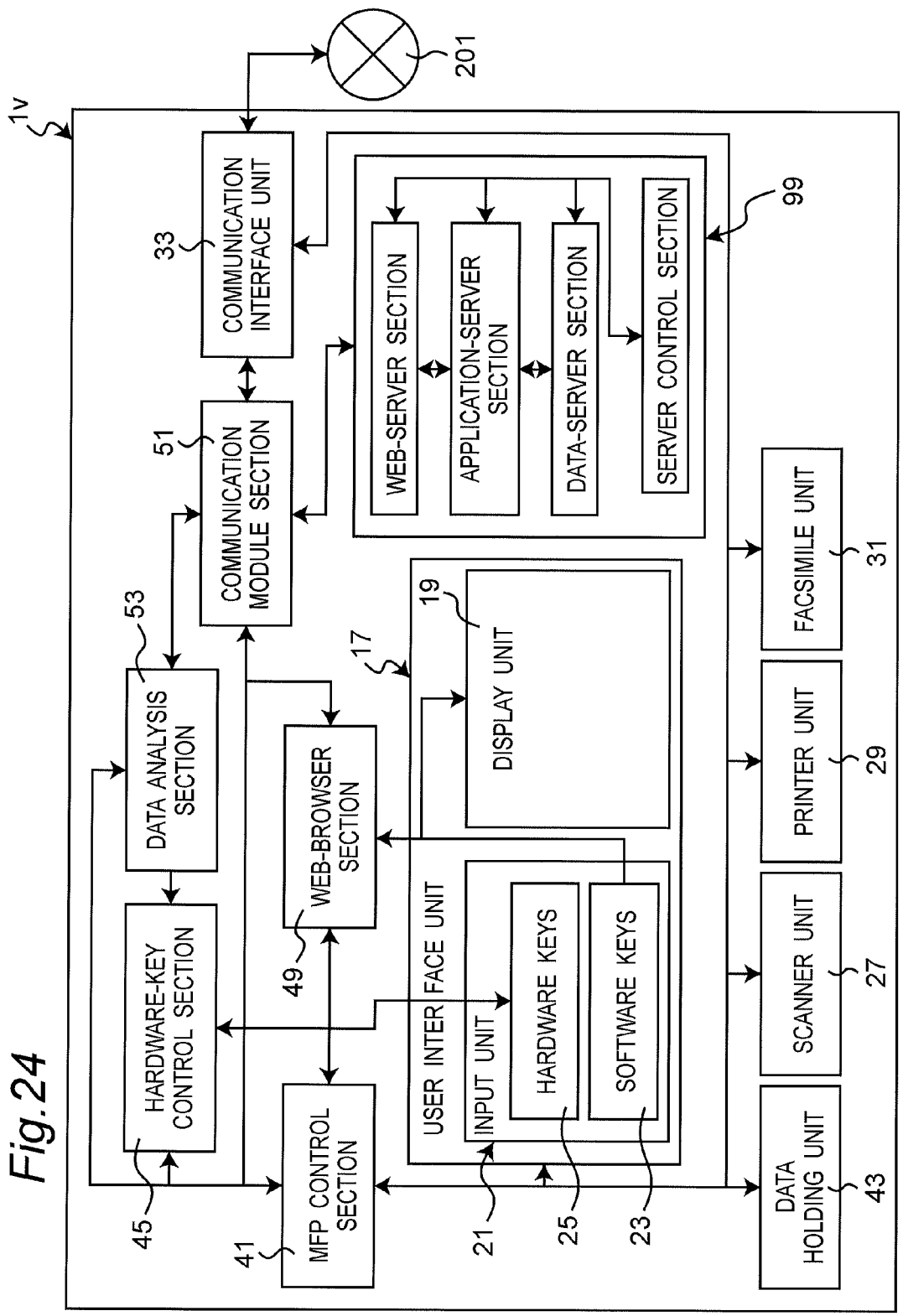

400; IMAGE PROCESSING DEVICE WITH
EXECUTABLE HARDWARE KEY AND
SERVER

This application is based on an application No. 2008-221151 filed in Japan, the contents of which are hereby incorporated by reference.

BACKGROUND OF THE INVENTION

1. Field of the Invention

The present invention relates to an image processing device and a server and an image processing system including them, and, in particular to an image processing device which has a web browser function and utilizes this function as an user interface and a server which supplies data in response to a request from the web browser in the image processing device and an image processing system including them.

2. Description of the Related Art

Along with developments in image processing technology and information processing technology in recent years, current image processing devices singly have been provided with a copying function, a scanning function, a printer function, a facsimile functions and the like intensively. In general, such image processing devices are referred to as digital complex machine (hereinafter, abbreviated as "complex machine" or "MFP (MultiFunction Peripheral)"). In general, a multifunction peripheral can be connected to a computer network and can execute image processing (image forming processing) while data being transmitted to and received from various types of devices, such as a personal computer, a server and another image processing device.

Further, some multifunction peripherals are adapted to make requests of another device for execution of functions of the device, through a network, and to utilize the results of the execution of the function. Such another device is referred to as a function-extension server, herein. The function-extension server executes predetermined data processing, in response to a request from the multifunction peripheral, and then, transmits the result of execution to a predetermined device. In this case, the predetermined device, which is the output destination, can be either the multifunction peripheral, another function-extension server, or the like. These multifunction peripherals can be equipped with data processing systems that conform to the contents of user's jobs (work flows), in cooperation with the function-extension server, which reduces the burdens on the users or enables the execution of image processing using latest image processing algorithms which are not included in the main bodies of the multifunction peripherals.

Along with the advancement of the sophistication and the increase of the functions of multifunction peripherals as described above, there has been increased the importance of user interfaces which form the contact points between multifunction peripherals and users. In actual, researches and developments for improving the usability of user interfaces have been continuously and actively conducted. Recent technical innovation has been increasingly accelerated and, also, multifunction peripherals have cooperation being increased in degrees with external devices. Thus, researches and developments about their user interfaces have been conducted while the attentions are focused onto the technical developments for easily updating the structures of the user interfaces as well as to the developments for the usability thereof. Particularly, attentions have been focused onto the customization of the user interface structures according to user's needs and onto technical developments for easily changing the user interface structures along with the update of a function thereof and the like.

Prior arts relating to implementations of user interfaces are illustrated below.

JP 2006-127503 A discloses an image processing device and a remote processing device. The image processing device and the remote processing device are connected to each other such that they can transmit and receive data to and from each other to constitute an image processing system. The image processing device in JP 2006-127503 A has a mode in which the image processing device itself operates solely (hereinafter, referred to as a "first mode") and a mode in which the control of the image processing device is mainly consigned to the remote processing device, and a user interface included in the image processing device is utilized for transmission and reception of information between a user and the remote processing device (hereinafter, referred to as a "second mode"). In the second mode, in actual, the user interface in the image processing device is under the control of the remote processing device.

In the second mode, the image processing device acquires, from the remote processing device, data relating to a menu screen to be displayed on the user interface, then structures a menu screen based on the data, and displays the menu screen on a display unit of the user interface. If the user inputs information, an instruction or the like through the menu screen displayed as described above, the image processing device transmits data relating to this input to the remote processing device, and the remote processing device executes predetermined processing and returns the result thereof to the image processing device. The image processing device, when receiving the result, performs operations according to this result so as to perform the operations according to the user's input.

As described, in the image processing system disclosed in JP 2006-127503 A, the remote processing device manages the data used for structuring the menu screen (the user interface) in the image processing device, and the remote processing device transmits it according to the state of the image processing device as needed, which eliminates the necessity of providing the data for structuring the menu screen with the image processing device. Therefore, the menu screen in the image processing device can be updated by updating the data included in the remote processing device. JP 2006-127503 A suggests that data described in markup languages (HTML, XML, WML, XHTML data and the like) can be used as data for structuring a menu screen. In other words, according to JP 2006-127503 A, the menu screen (the user interface) is implemented as a web-based user interface.

An image processing device, such as a multifunction peripheral, generally includes a user interface having hardware keys as well as a menu screen, and JP 2006-127503 A discloses a method for changing over, between the first mode and the second mode, the assignment of functions to the respective hardware keys included in the image processing device (refer to Table 2 in JP 2006-127503 A, for example). However, the disclosure in JP 2006-127503 A relates to a method for changing over the functions of the hardware keys between first and second modes and does not describe a changeover of the control of the hardware keys according to various conditions that might have been occurred in each of the aforementioned two modes.

JP 2005-011146 A discloses an operation screen display device which is applicable to a user interface in an image processing device, such as a multifunction peripheral. The operation screen display device in JP 2005-011146 A acquires a routine task template from the outside, stores it and, then, structures an operation screen image based on various types of information included in the stored routine task template. Further, JP 2005-011146 A discloses an example of utilization of an XML format as a data format of the routine task template.

The routine task template includes UI information as descriptions for creating a user interface. The UI information can include information indicating that operation onto a certain key or a certain display area should be prohibited (option information). The operation screen display device in JP 2005-011146 A creates and displays an operation screen according to the contents of descriptions in the acquired routine task template and comprehensively prohibits the operations on certain keys and/or certain display areas which are specified from the UI information. As described above, in the invention disclosed in JP 2005-011146 A, the user interface is structured according to the descriptions in the routine task template and, also, the operations on a certain key and/or a certain display area are comprehensively prohibited according to the mode of a routine task.

Besides examples in the prior-art documents aforementioned, there has been known a method which causes a multifunction peripheral to have a browser function (for example, a web browser), so as to acquire necessary information from a server (for example, a web server) as needed, and to create a user interface, thereby an user interface is able to be easily designed and altered. Such a user interface is referred to as a web-based user interface, for example.

When an image processing device is implemented using a touch panel liquid crystal display and the like as a display/input unit in combination with the method of the web-based user interface, the display screen (as a display unit) and software keys embedded in the display screen (as an input unit) are realized through a web browser. Further, the structures of the display screen and the software keys can be easily altered by updating the server.

Conventionally, a multifunction peripheral includes hardware keys, in addition to software keys, as standard input means. The hardware keys are buttons to which functions are varyingly and dynamically assigned according to the state of the multifunction peripheral. For example, the hardware keys include a start key, which is configured as a large-sized button with particularly excellent operability. The start key is the button that is used with a particularly high frequency. Further, according to the current mode of the multifunction peripheral, a certain function is dynamically assigned to the start key so that it has a function of executing scanning, copying or facsimile transmission, for example. Furthermore, the validity/invalidity of the operation (pushing) on the start key is dynamically controlled in real time, along with the change of the state of the multifunction peripheral, in the following way. That is, when conditions required for the execution of the function currently assigned to the start key (for example, the presence or absence of an input of a facsimile transmission destination in the case of the function of facsimile transmission) are not satisfied, the operation on the start key is made invalid. And only if the conditions required for the execution of the function are satisfied, the operation thereon is made valid.

However, when the user interface in the multifunction peripheral is implemented as a web-based user interface, information inputted to the multifunction peripheral through the user interface is accumulated in an external server. Accordingly, even in a case where a hardware key is pushed, the multifunction peripheral is required to additionally communicate with the external server in order to acquire, from the external server, information about a state of the multifunction peripheral itself before starting the operation associated with the pushed hardware key, so as to recognize the state of the multifunction peripheral itself and a content of the operation to be executed in response to the pushing of the hardware key.

This also applies as well to the case where the multifunction peripheral is at a state where it should ignore the pushing of the hardware key (at a state where the operation assigned to the hardware key is invalid). If the hardware key is pushed, the multifunction peripheral communicates with the external server and, only after receiving a response therefrom, the multifunction peripheral can recognize that the operation assigned to the hardware key is invalid. In other words, in a case where a multifunction peripheral including a web-based user interface having hardware keys, the multifunction peripheral must have additional means which is arranged to communicate with an external server and determine, based on a response from the external server, whether the operation assigned to the pushed hardware key is valid or invalid.

SUMMARY OF THE INVENTION

In view of the aforementioned circumstances, it is an object of the present invention to provide an image processing device with a web-based user interface, which is able to dynamically control its hardware keys (for example, controlling the validity/invalidity thereof) along with the state of the image processing device in real time and has more simplified configuration than those of conventional ones at least.

Further, it is another object of the present invention to provide an image processing device employing, as a user interface, a web browser which changes over the validity/invalidity of the pushing of hardware keys according to the contents being displayed on a user interface display unit dynamically and immediately in real time.

In one aspect of the present invention, an image processing device is provided. The image processing device includes: a communication interface unit; a user interface display unit which provides information to a user; a user interface input unit having a hardware key which is arranged to receive an input from the user; a web-browser section which is arranged to receive page data from a web server, structure a display screen on the user interface display unit based on the page data, and display the display screen on the user interface display unit; a data analysis section which is arranged to determine whether an operation on the hardware key is to be valid or invalid based on the page data; and a hardware-key control section which is arranged to control validity/invalidity of the operation on the hardware key based on the determination made by the data analysis section.

In another aspect of the present invention, a server device is provided. The server device includes: a communication interface unit; a web-server section which is arranged to, in response to a request from a web browser, transmit page data to the web browser; an application-server section which is arranged to execute predetermined processing according to an instruction based on the request received from the web-server section and return text data described in a markup language to the web-server section; and a data-server section which is arranged to accumulate data transmitted from an image processing device equipped with the web browser and structure a database relating to a state of the image processing device, wherein the application-server section, based on the instruction, inquires of the data-server section about the state of the image processing device and determines whether an operation on a hardware key included in the image processing device is to be valid or invalid based on a response to the inquiry, and generates the text data based on the determination.

In yet another aspect of the present invention, a computer-readable medium storing a program being executed on a computer of an image processing device is provided. The program includes: code that causes the computer to perform a web-browser function to receive page data from a web server through a communication interface unit of the image processing device, structure a display screen image on a user interface display unit of the image processing device based on the page data and display the display screen on the user interface display unit, the user interface display unit being arranged to provide information to a user; code that causes the computer to perform a data analysis function to determine whether an operation on a hardware key of a user interface input unit of the image processing device is to be valid or invalid based on the page data, the user interface input unit being arranged to receive an input from the user; and code that causes the computer to perform a hardware-key control function to control validity/invalidity of the operation on the hardware key based on the determination made by the data analysis function.

In further another aspect of the present invention, a computer-readable medium storing a program being executed on a computer of a server device is provided. The program includes: code that causes the computer to perform a web-server function, in response to a request from a web browser, to transmit page data to the web browser through a communication interface unit of the server device; code that causes the computer to perform an application-server function to execute predetermined processing according to an instruction based on the request received from the web-server section and return text data described in a markup language to said web-server function; and code that causes the computer to perform a data-server function to accumulate data transmitted from an image processing device equipped with the web browser and structure a database relating to the state of the image processing device; wherein the application-server function, based on the instruction, inquires of said data-server function about the state of the image processing device and determines whether an operation on a hardware key included in the image processing device is to be valid or invalid based on a response to the inquiry, and generates the text data based on the determination.

In the present invention, it is possible to dynamically control hardware keys of the image processing device having a web-based user interface along with the state of the image processing device in real time with a simplified structure than those of conventional ones at least.

Further, in the image processing device having the web-based user interface according to the present invention, it is possible to dynamically and immediately change over the validity/invalidity of pushing of the hardware key according to a content on its user interface display unit being displayed by the web browser in real time.

Other objects and further features of the present invention will be apparent from the following detailed description when read in conjunction with the accompanying drawings.

BRIEF DESCRIPTION OF THE DRAWINGS

FIG. 13 is a table illustrating the correspondence between descriptions of information relating to rendering in the HTML data and the control of the validity/invalidity of the operation on the hardware key, which is performed by the image processing device;
FIG. 24 is a block diagram of a variation of the configuration of the image processing device.

DETAILED DESCRIPTION OF THE PREFERRED EMBODIMENTS

Figure 1:
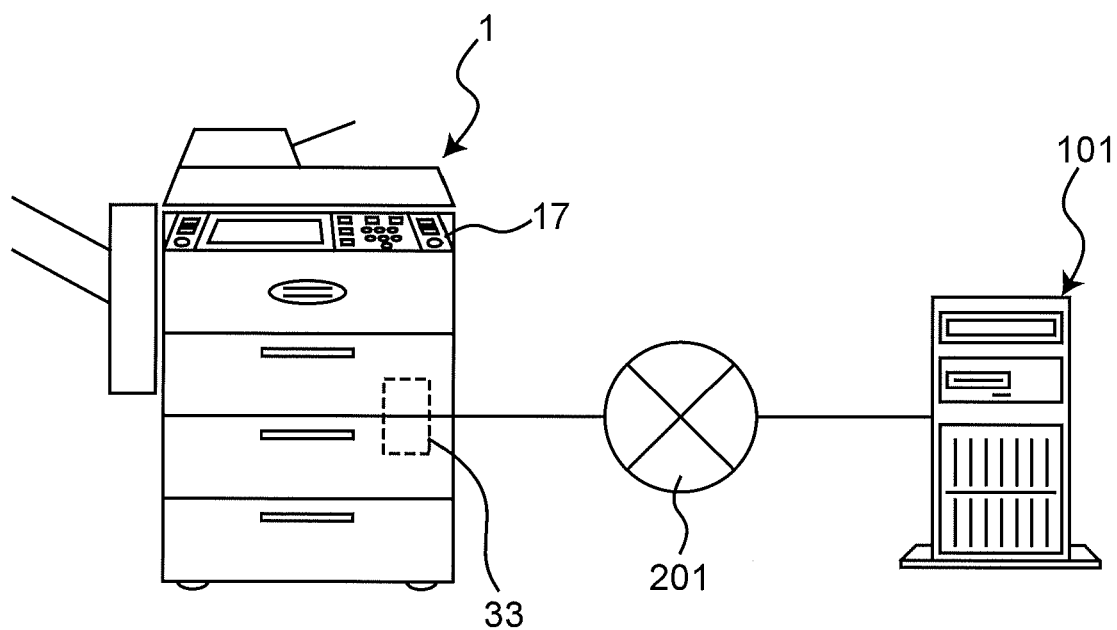
FIG. 1 is a schematic diagram of an image processing system.

Hereinafter, with reference to the accompanying drawings, an image processing device according to an embodiment of the present invention will be described. In the embodiment, the image processing device is a digital multifunction peripheral. However, the image processing device according to the present invention is not limited to a digital multifunction peripheral and may include various types of image processing devices such as a copying machine, a printer, a scanner, a facsimile machine.

The multifunction peripheral according to the embodiment of the present invention is an image processing devices which have a browser function and a communication function and can be connected to a server through a network. The browser function implements a user interface display unit and at least a part of an input unit (software keys), for example, on a touch panel liquid crystal display, based on data acquired from the server through the working of the communication function.

However, the server is not necessarily required to be a device outside of the multifunction peripheral. In the embodiment of the present invention, the multifunction peripheral can be equipped with a server function inside thereof, using software. In this case, a browser module having the browser function and a server module having the server function transmit and receive data to and from each other within the multifunction peripheral and, thus, the multifunction peripheral by itself realizes an image processing system according to the present invention.

The multifunction peripherals according to the embodiment of the present invention can acquire web-page data (for example, text data described in a markup language such as HTML, XHTML or XML, and binary data such as image data which can be referred by the text data, and hereinafter, these data will be referred to as "web-page data") from the server through the working of the browser function and structure a user interface based on the web-page data.

Further, a multifunction peripheral according to a first embodiment of the present invention analyzes web-page data acquired from a server and, therefore, can control the validity/invalidity of the operations on hardware keys based on this web-page data. By doing this, the multifunction peripheral according to the first embodiment can control the validity/invalidity of the operations on the hardware keys, without requiring to additionally communicate with the server for controlling the validity/invalidity of the operations on the hardware keys.

In the first embodiment, the multifunction peripheral analyzes the information described in text data, such as HTML data, and controls the validity/invalidity of the operations on the hardware keys. In this case, preferably, the server embeds, in text data such as HTML data, information about the validity/invalidity of the operations on the hardware keys, as comments, with a method which exerts no influence on the web browser, for example. This enables controlling the hardware keys, without exerting any affection on the contents of the screen displayed for the user, since the information about the control of the hardware keys is described in the comments in the HTML data.

Also, the multifunction peripheral can analyze rendering-related information described in the text data, such as HTML data, for controlling the validity/invalidity of the operations on the hardware keys. In this case, the rendering-related information is constituted by tags indicative of rendering instructions and the like in the HTML data, tags which cause image files to be referred and cause images to be attached, and the like. Also, the multifunction peripheral can analyze binary data such as image data to be referred from the text data, such as HTML data, for controlling the validity/invalidity of the operations on the hardware keys. The rendering-related information is originally data required for structuring a user interface screen image. Therefore, it is possible to control the hardware keys, without adding, to the HTML data, additional information for controlling the operations of the hardware keys.

Further, a multifunction peripheral according to a second embodiment of the present invention can directly make a request of a predetermined application included in a server for execution of processing for determining the operations on hardware keys are to be valid or invalid, further can acquire the result of the execution of this application and can control the validity/invalidity of the operations on the hardware keys, based on the acquired result of the execution.

In the multifunction peripherals according to the embodiments of the present invention, the hardware keys include, but not limited to, a start key which receives instructions for execution of jobs, a setting key for starting changing and the like of settings of the multifunction peripheral, an interrupt key for inputting jobs by interrupting jobs being executed or jobs waiting for being executed and the like.

The multifunction peripherals according to the embodiments of the present invention have an operation mode for realizing a user interface in the multifunction peripheral through the cooperative operations by the server and the browser function included in the multifunction peripheral as described above (an external-application cooperation mode). In this operation mode, the multifunction peripherals cause the server to make all determinations and decisions, such as determination as to whether the operations on the hardware keys are to be valid or invalid, decisions of the contents and the like of the processing to be executed according to the operations on the hardware keys, and the multifunction peripherals receive the determinations and decisions made by the server, as web-page data and the like, and perform operations based on the determinations and decisions made by the server. By doing this, it is possible to prevent the occurrence of troubles due to double control by the server and the multifunction peripheral itself.

Further, in the operation mode for causing the server to make all determinations and decisions, such as determination as to whether the operations on the hardware keys are to be valid or invalid, decisions of the contents and the like of the processing to be executed according to the operations on the hardware keys, each multifunction peripheral according to the embodiments of the present invention monitors the state of the inside of the multifunction peripheral and, if the multifunction peripheral determines that the multifunction peripheral is at a state in which the execution of jobs is prevented, the multifunction peripheral can control by itself, in preference to the determinations and decisions made by the server. By doing this, it is possible to prevent the occurrence of accidents during execution of jobs, due to anomalies and the like within the multifunction peripheral.

<First Embodiment>

(The Structure of Image Processing System)

FIG. 1 is a schematic diagram of an image processing system 301 according to the first embodiment of the present invention. The image processing system 301 includes a multifunction peripheral (MFP) 1, a server 101, and a network 201 which connects the MFP 1 and the server 101 to each other. The multifunction peripheral 1 includes a user interface 17 as a contact point to a user, and a communication interface unit 33 which is a device constituting a contact point to the network 201.

(The Hardware Structure of the MFP 1)

Figure 2:
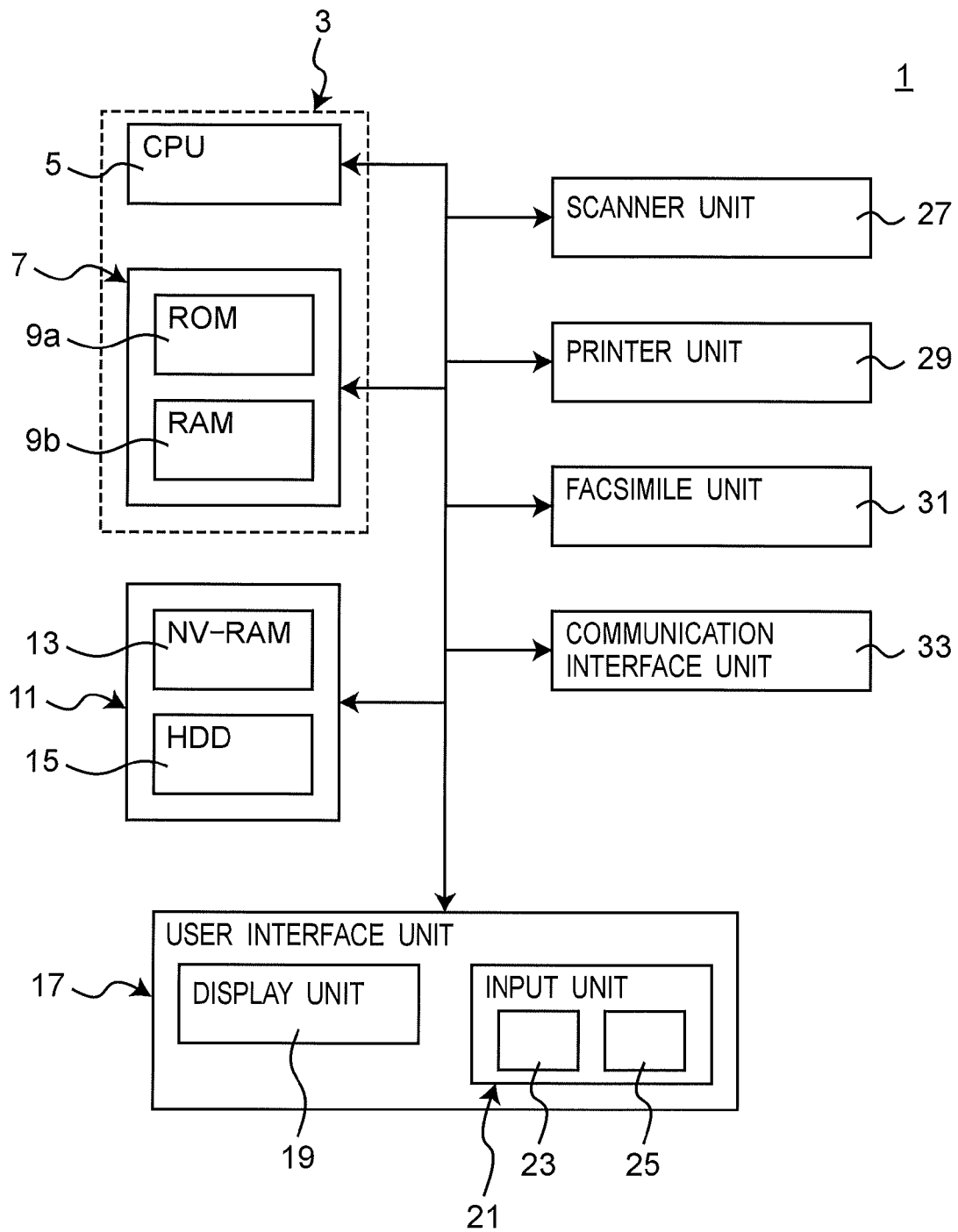
FIG. 2 is a block diagram of hardware configuration of an image processing device.

FIG. 2 is a block diagram illustrating the hardware configuration of the MFP 1.

The MFP 1 includes a central processing unit (CPU) 5, a read-only memory (ROM) 9a, a random access memory (RAM) 9b, a nonvolatile memory (NV-RAM) 13, and a hard disk drive (HDD) 15. The CPU 5, the ROM 9a, and the RAM 9b constitute a computer main part 3 of the multi-function peripheral, and the ROM 9a and the RAM 9b constitute a main storage device 7 in the computer main part 3. Further, the NV-RAM 13 and the HDD 15 constitute a secondary storage device 11 in the computer main part 3. The computer main part 3 in the MFP 1 executes programs according to the embodiment of the present invention, which are held in the main storage device 7 or the secondary storage device 11, for realizing an image processing device according to the embodiment of the present invention. Further, these programs can be stored in portable storage mediums such as a flexible disk to be distributed or can be distributed through electric communication lines such as the Internet.

The MFP 1 includes a scanner unit 27 which photoelectrically reads image information on printing mediums, such as paper sheets, and generates electronic data about this image information, a printer unit 29 which forms image information on printing mediums, such as paper sheets, based on electronic data indicative of image information, a facsimile unit 31 which performs facsimile transmission based on electronic data indicative of image information and also receives facsimile transmission from the outside and generates electronic data indicative of the image information, and the communication interface unit 33 which transmits and receives data through the network 201 (FIG. 1) and the like.

Further, the MFP 1 includes the user interface unit 17 which is a contact point for inputting and outputting information from and to the user. The user interface unit 17 includes a display unit 19 which is a standard output means which supplies information to the user, and an input unit 21 which is a standard input means which receives information from the user, and the input unit 21 is constituted by software keys 23 and hardware keys 25. As is well known, the software keys 23 can be formed integrally with the display unit 19 using a touch panel liquid crystal display.

Figure 3:
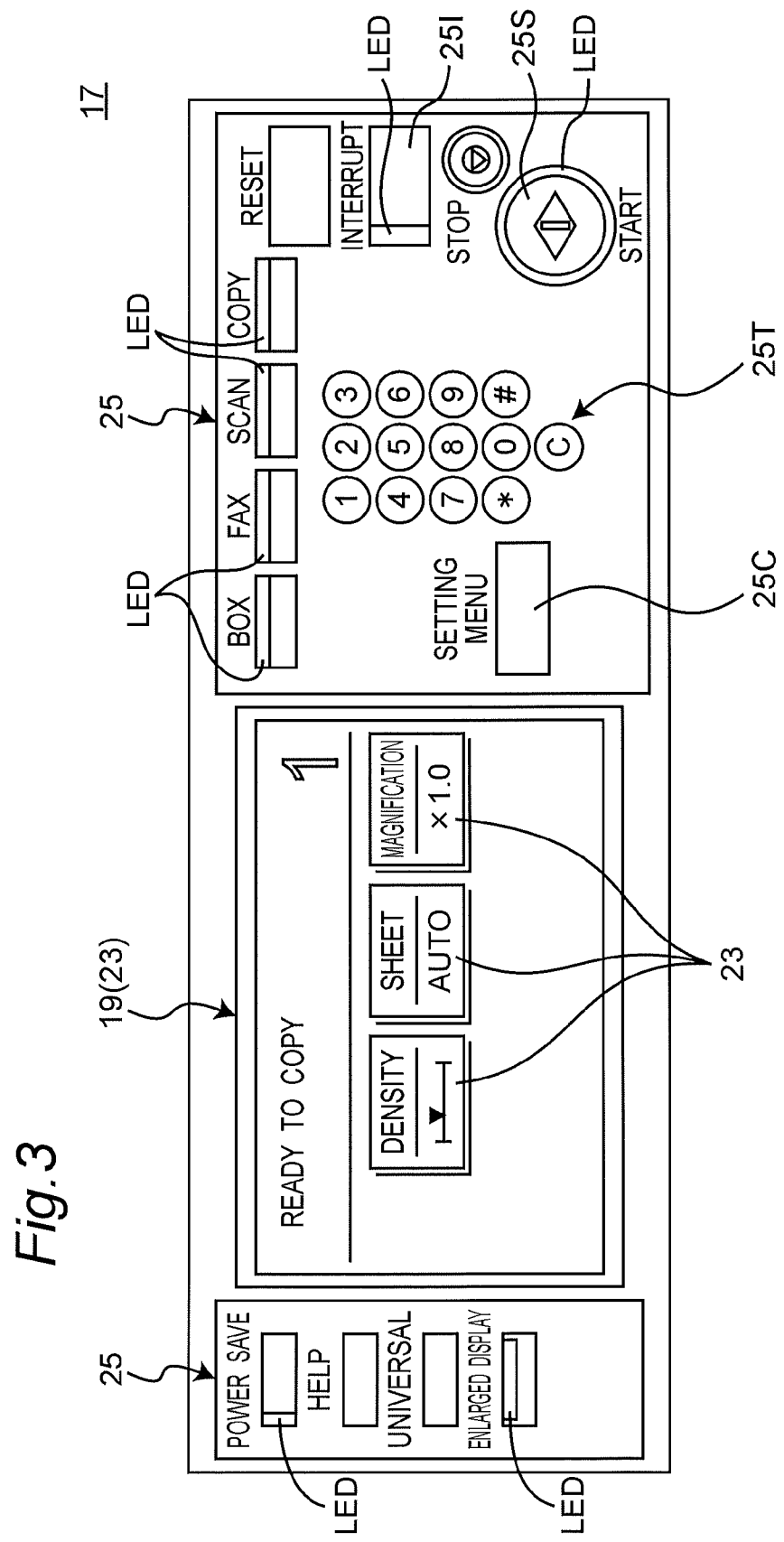
FIG. 3 is a schematic diagram of a user interface unit of the image processing device.

FIG. 3 is a schematic diagram illustrating the user interface unit 17 in detail. As described above, the user interface unit 17 includes the display unit 19, the software keys 23, and the hardware keys 25.

At first, the display unit 19 will be described in brief. The display unit 19 is constituted by a touch panel liquid crystal display. As will be described later, in the multifunction peripheral according to the present embodiment, the contents displayed on the display unit 19 are formed based on screen image data structured based on web-page data acquired by a web browser.

The contents displayed on the display unit 19 include the software keys 23. The software keys 23 are also structured based on web-page data which the web browser acquires from the server 101.

If any of the software keys 23 displayed on the display unit 19 is pushed, the web browser recognizes this pushing and transmits information about the pushed software key 23 to the server 101 (transmission of a request), and the server 101 executes predetermined processing to return updated web-page data to the MFP 1 (reception of a response). On receiving the updated web-page data from the server 101, the web browser updates the contents on the display unit 19, based on this data. Further, the web browser can cause the MFP 1 to execute predetermined processing based on data received from the server 101. In other words, the server 101 determines the state of the display on the display unit 19 including the software keys 23 and the operations of the multifunction peripheral when the software keys 23 have been pushed based on data transmitted from the web browser in the multifunction peripheral 1, and the multifunction peripheral 1 performs operations, when receiving data about this determination from the server 101.

On the other hand, the hardware keys 25 are buttons which are provided in both sides of the touch panel liquid crystal display (19, 23).

In the left side of the touch panel liquid crystal display (19, 23), there are provided a power save key for causing a transition to a power save mode, a help key for displaying a help screen, a universal key for causing a transition to universal display screen, and an enlarged-display key for causing a transition to enlarged display screen. According to the characteristics of the functions assigned to the keys, some of the keys are provided with LEDs for displaying their conditions. The LEDs can indicate the ON/OFF states of the functions assigned to the keys and, also, can be lighted in one or more colors so as to indicate that the pushing of the keys are valid or invalid.

In the right side of the touch panel liquid crystal display (19, 23), there are provided a box for changing over the job mode, respective mode keys for facsimile, scanning and copying and the like, ten keys 25T for inputting settings such as the number of copies, a setting menu key 25C for causing a transition to a state which enables editing of the setting items of the multifunction peripheral 1, a reset key, an interrupt key 25I for causing interrupts of jobs, a stop key, a start key 25S, and the like. The mode keys are provided with LEDs for notifying the user of the current mode of the multifunction peripheral 1. The interrupt key 25I is also provided with an LED for notifying the user of the ON/OFF of interrupts and, also, for notifying the user whether the interrupt of the current job is allowed, with the color or the condition of lighting of the LED. The start key 25S is provided with an LED as an indication means which notifies the user whether or not the start key 25S can be pushed (whether or not the pushing operation thereon is valid or invalid), with the color or the condition of lighting of the LED. The multifunction peripheral 1 according to the first embodiment of the present invention is capable of changing the types of the colors of the LEDs being lighted, the lighting conditions of the LEDs and the like, based on web-page data received from the server 101.

(The Hardware Structure of the Server 101)

Figure 4:
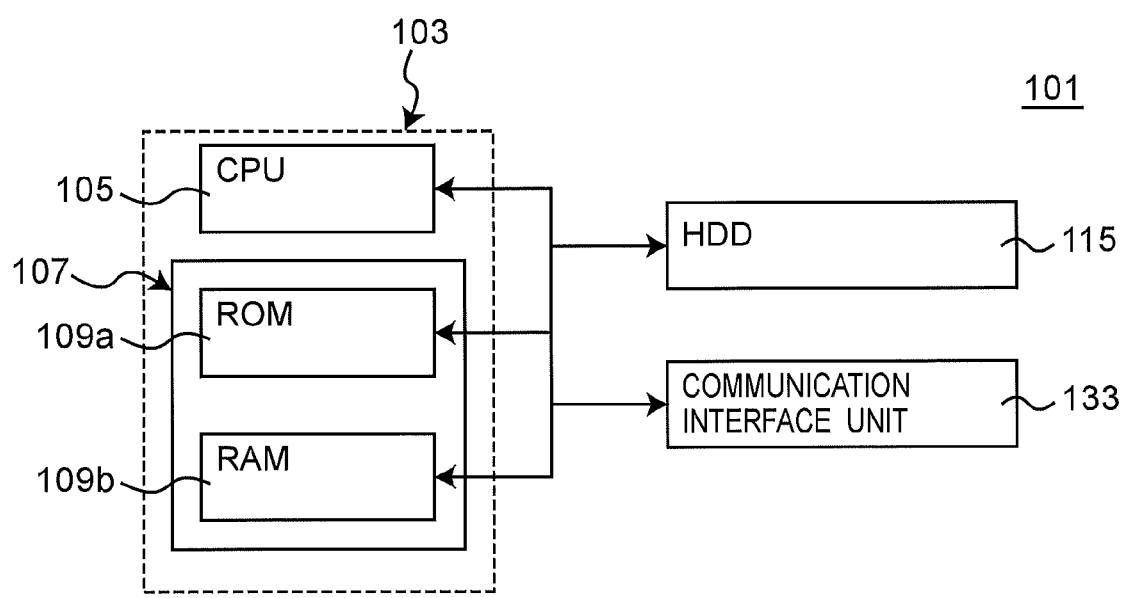
FIG. 4 is a block diagram of hardware configuration of a server.

FIG. 4 is a block diagram illustrating the hardware structure of the server 101.

The server 101 includes a central processing unit (CPU) 105, a read-only memory (ROM) 109a, a random access memory (RAM) 109b, and a hard disk drive (HDD) 115. The CPU 105, the ROM 109a and the RAM 109b constitute a computer main part 103 of the server, and the ROM 109a and the RAM 109b constitute a main storage device 107 in the computer main part 103. Further, the HDD 115 constitutes a secondary storage device in the computer main part 103. The computer main part 103 in the server 101 executes programs according to the embodiment of the present invention, which are held in the main storage device 107 or the secondary storage device, for realizing a server according to the embodiment of the present invention. Further, these programs can be also stored in a portable storage medium such as a flexible disk to be distributed or can be distributed through electric communication lines such as the Internet.

The server 101 includes a communication interface unit 133 which transmits data to the network 201 (FIG. 1) and the like and, also, receives data from the network 201.

(The Functional Structure of the MFP 1)

Figure 5:
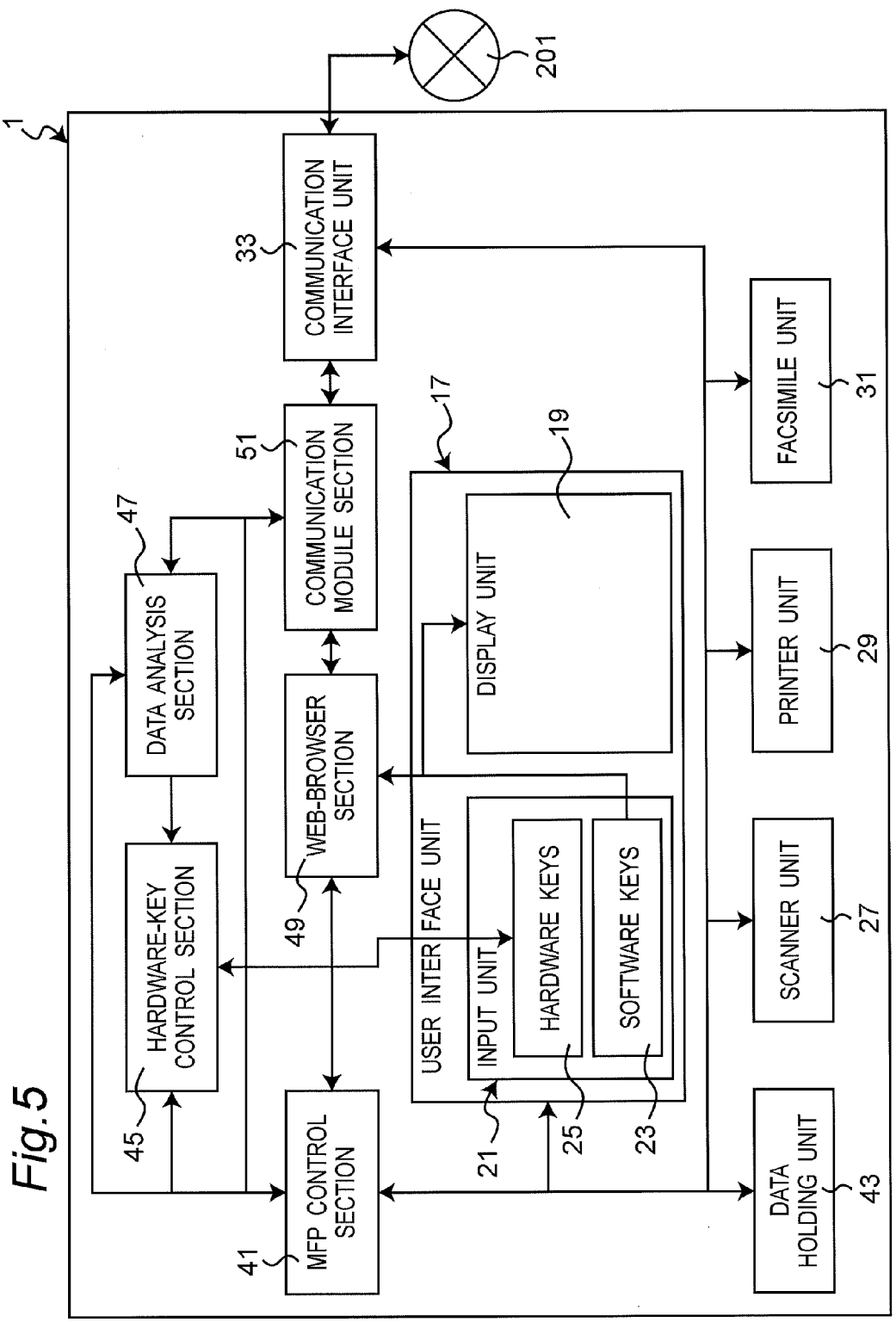
FIG. 5 is a block diagram of functional structure of the image processing device according to a first embodiment.

FIG. 5 is a block diagram of the functional structure of the MFP 1. The function blocks illustrated in FIG. 5 include functions which the computer main part 3 (FIG. 2) realizes by executing the programs according to the embodiment of the present invention. In FIG. 5, the hardware elements illustrated in FIG. 2 are designated by the same reference numerals as those in FIG. 2.

The MFP 1 includes an MFP control section 41. The MFP control section 41 controls the overall operations of the MFP 1. For example, on receiving, from a hardware-key control section 45, a notification of the fact that a certain hardware key 25 has been pushed, the MFP control section 41 receives, from a web-browser section 49, the contents of processing to be executed, as needed, and, further, the MFP control section 41, according to the contents of this processing, instructs the blocks relating to this processing to execute predetermined processing using data held by a DATA holding unit 43 as needed.

The DATA holding unit 43 is a storage device which holds image data and the like. The DATA holding unit 43 stores and reads data, under the control of the MFP control section 41.

The communication interface unit 33 refers to a device (hardware) for establishing a physical connection between the MFP 1 and the network 201. The communication interface 33 is constituted by, for example, a network card. The MFP 1 and the server 101 transmit and receive data to and from each other, through the network 201 and the communication interface unit 33.

A communication module section 51 is a communication module (software) which the computer main part 3 (FIG. 2) realizes by executing a predetermined program. The communication module section 51 takes charge of reception and transmission of data from and to the communication interface 33 and the like. For example, data transmitted from the server 101 through the network 201 is temporarily received by the communication module section 51 through the communication interface unit 33 and, then, is transferred therefrom to the modules constituting a data analysis section 47 and the web-browser section 49 and the like. Further, data to be transmitted from the web-browser section 49 to the server 101 is also temporarily received by the communication module section 51 and then is transferred therefrom to the communication interface unit 33.

The web-browser section 49 transmits a request message to the server 101 and receives a response message regarding the request message. Further, the web-browser section 49 acquires web-page data and structures a display screen and the software keys 23 on the display unit 19 in the user interface unit 17, based on the acquired data. The web-browser section 49 and the server 101 perform communications with each other, according to, for example, the Hyper Text Transfer Protocol (HTTP), for transmitting and receiving requests and responses to and from each other. Further, the web-page data transmitted from the server 101 is also transmitted to the data analysis section 47.

Based on the web-page data supplied from the server 101, the data analysis section 47 generates data required for the hardware-key control section 45 to control the validity/invalidity of the operation on the hardware key 25 ("the result of the validity/invalidity determination") and, then, supplies this data to the hardware-key control section 45.

The hardware-key control section 45 controls the hardware keys 25, particularly, out of the user interface unit 17. The hardware-key control section 45 controls the validity/invalidity of the operations on the hardware keys 25 based on the result of the validity/invalidity determination, which is received from the data analysis section 47, and, also, controls the lighting of the LEDs (FIG. 3) in the hardware keys 25, as needed. Further, the hardware-key control section 45 recognizes that a certain hardware key 25 has been pushed and determines whether the operation on the pushed hardware key 25 is valid or invalid and, if it is valid, notifies the MFP control section 41 of the fact that this hardware key 25 has been pushed. The hardware-key control section 45 may be configured such that, if the operation on the recognized hardware key 25 is invalid, it generates no notification of this pushing with respect to the MFP control section 41.

(The Functional Structure of the server 101)

Figure 6:
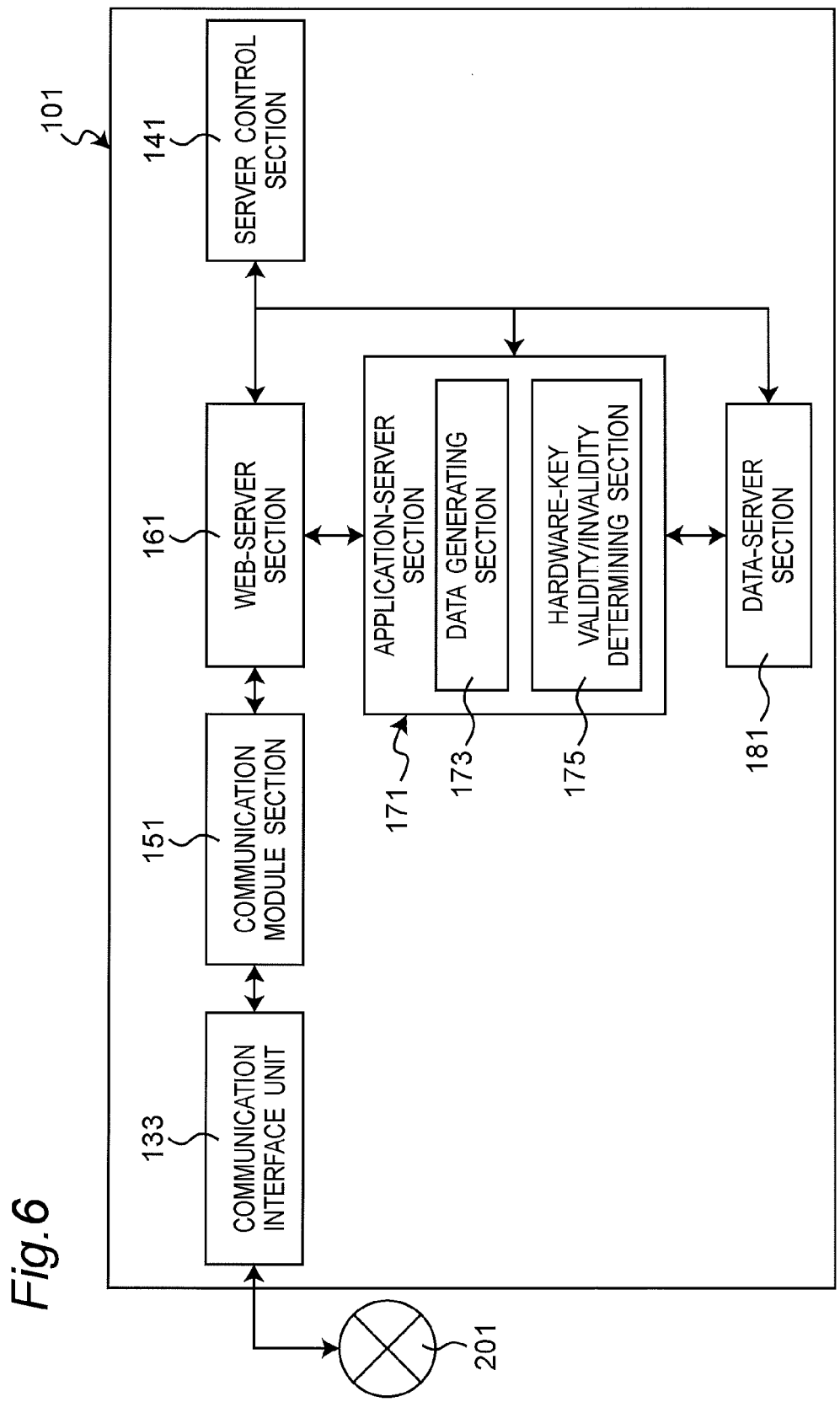
FIG. 6 is a block diagram of functional structure of the server according to the first embodiment.

FIG. 6 is a block diagram of the functional structure of the server 101. The functional blocks illustrated in FIG. 6 include functions which the computer main part 103 (FIG. 4) realizes by executing the programs according to the present invention.

In FIG. 6, the hardware elements illustrated in FIG. 4 are designated by the same reference symbols as those in FIG. 4.

The server 101 includes a server control section 141. The server control section 141 controls the overall operations of the server 101. For example, the server control section 141 can control the communication interface unit 133 and a communication module section 151 to cause them to communicate with the multifunction peripheral 1 and, concurrently, can overall manage the operations of the respective server modules in a web-server section 161, an application-server section 171, and a data-server section 181.

The communication module section 151 is a communication module (software) which the computer main part 103 (FIG. 4) realizes by executing a predetermined program. The communication module section 151 takes charge of reception and transmission of data from and to the communication interface unit 133 and the like. For example, data of an HTTP request transmitted from the multifunction peripheral 1 through the network 201 is temporarily received by the communication module section 151 through the communication interface unit 133 and, then, is transferred therefrom to the module constituting the web-server section 161. Further, data of response messages using HTTP, which is generated by the web-server section 161, is also temporarily received by the communication module 151 and then is transferred therefrom to the communication interface unit 133.

The web-server section 161 has the function of receiving a request message transmitted from the web-browser section 49 in the multifunction peripheral 1 and returning web-page data, as a response message for this request message, to the web-browser section 49. The web-server section 161 makes a request of the application-server section 171 for executing processing for creating HTML data, based on the request message. Further, the web-server section 161 structures web-page data from the HTML data and the like created by the application-server section 171 and transmits it as a response message to the web-browser section 49 in the multi-function peripheral 1.

If the application-server section 171 receives a request for the creation of HTML data from the web-server section 161, a data generating section 173 executes processing for creating HTML data. At this time, a hardware-key validity/invalidity determining section 175, on receiving a request from the data generating section 173, inquires of the data-server section 181 about data relating to the state of the multi-function peripheral 1, determines that the operations of the hardware keys 25 in the multifunction peripheral 1 are to be valid or invalid based on responses from the data-server section 181, and transmits the result of the determination to the data generating section 173. The data generating section 173 creates HTML data, according to the result of the determination made by the hardware-key validity/invalidity determining section 175, and transmits this data to the web-server section 161.

The data-server section 181 has a database function of accumulating data relating to the state of the MFP 1, based on data transmitted from the MFP 1, such as a request message. The data-server section 181 is a database which accumulates information inputted from the input unit 21 in the MFP 1 and data relating to the state of the MFP 1 and also updates them as needed. The data-server section 181 acquires data indicative of the state of the MFP 1 and continuously and repeatedly updates them.

Through the cooperative operations of the three types of the server functions, the server 101, on receiving a request message from the MFP 1, can generate HTML data based on the content of the request message, can generate web-page data and then can respond to the MFP 1. In creating the HTML data, based on the content of the request message, the application-server section 171 makes a reference to information about the state of the MFP 1, which is held by the data-server section 181, determines the operations of the hardware keys 25 in the MFP 1 to be valid or invalid, and creates HTML data reflecting the content of this determination.

(The Flow of Processing)

Figure 7:
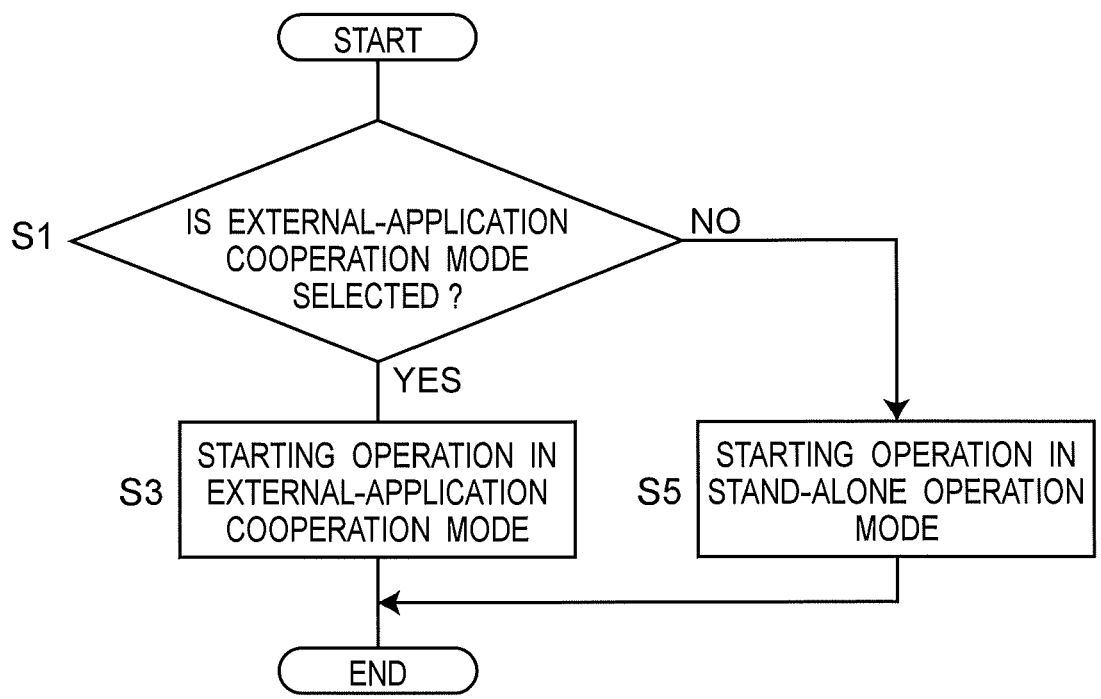
FIG. 7 is a flow chart of processing executed by the image processing device.

Next, the flows of processing in the MFP 1 and the server 101 will be described. The CPU 5 in the MFP 1 or the CPU 105 in the server 101 realizes the processing illustrated in the respective flow charts which will be described below, by executing programs stored in the main storage device or the secondary storage device. FIG. 7 illustrates a portion of a flow chart regarding image processing (image forming processing) in the MFP 1.

In step S1, the MFP 1 determines whether to operate in an external-application cooperation mode or in a stand-alone operation mode. In association with step S1, the user can generate an instruction for the operation mode to the MFP 1. The external-application cooperation mode is an operation mode in which the MFP 1 executes image processing (image forming processing) in cooperation with an application included in the server 101, and, in this operation mode, the user interface unit 17 is structured based on web-page data which the web-browser section 49 has acquired from the server 101. The stand-alone operation mode is an operation mode in which the MFP 1 executes image processing (image forming processing) using only its own functions. In this operation mode, the MFP 1 does not need to communicate with the server 101. The embodiment of the present invention relates to control of the validity/invalidity of the operations on the hardware keys 25 in the external-application cooperation mode. Therefore, hereinafter, unless otherwise specified, it is to be assumed that the MFP 1 may perform operations in the external-application cooperation mode.

In step S3, the MFP 1 starts an operation in the external-application cooperation mode.

In step 5, the MFP 1 starts an operation in the stand-alone operation mode.

Figure 8:
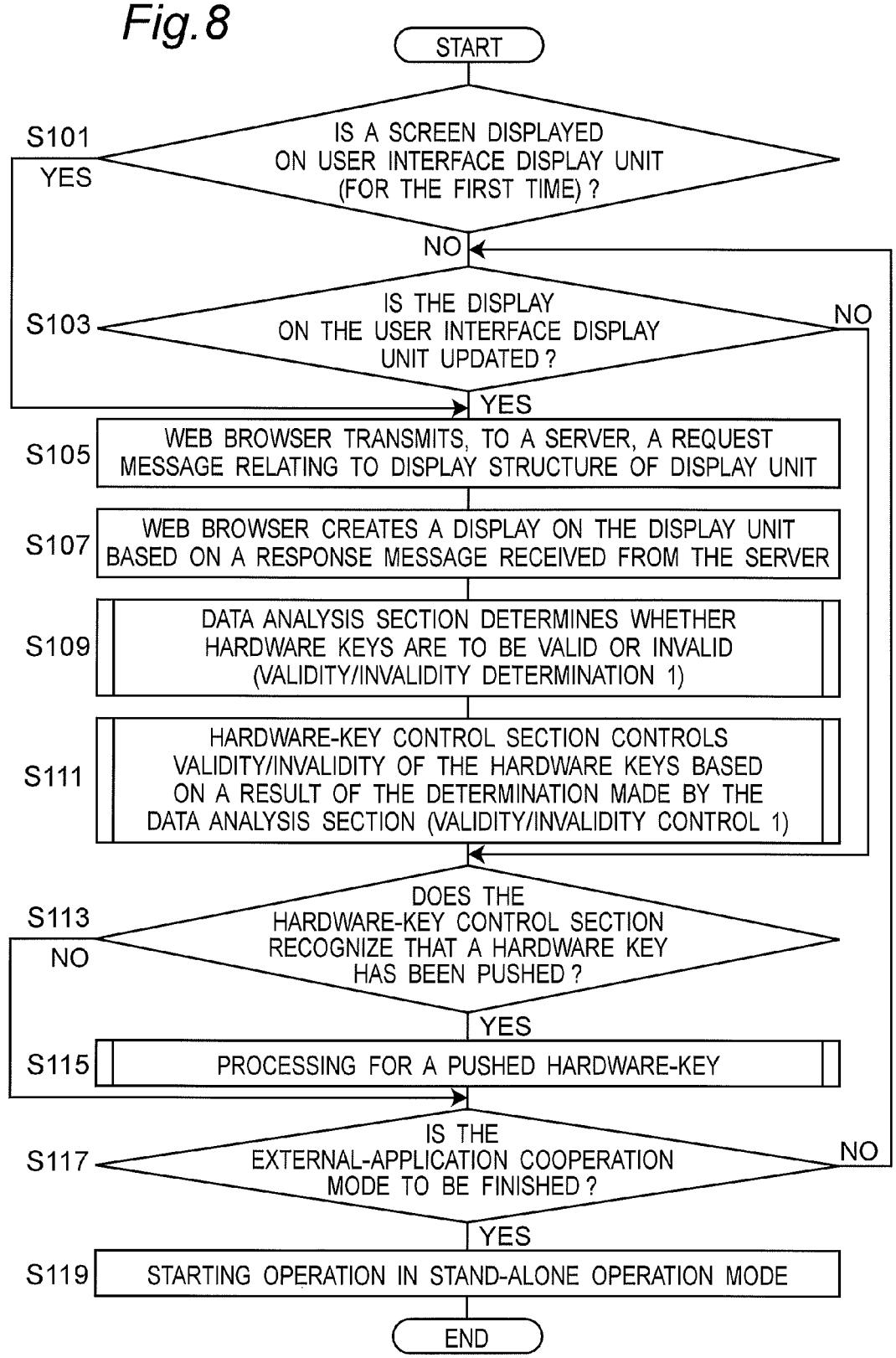
FIG. 8 is a flow chart of processing executed by the image processing device.

FIG. 8 is a flow chart of processing relating to the user interface unit 17, in the case where the MFP 1 performs operations in the external-application cooperation mode.

In step S101, the MFP 1 determines whether or not the display unit 19 in the user interface unit 17 should be displayed for the first time, after the start of the operation in the external-application cooperation mode.

If the MFP 1 determines that the display unit 19 should be displayed for the first time ("YES" in step S101), the processing shifts to step S105.

If the MFP 1 determines that this is not the first time that the display unit 19 should be displayed ("NO" in step S101), the processing shifts to step S103.

In step S103, the MFP 1 determines whether or not it is necessary to update the screen displayed on the display unit 19 in the user interface unit 17.

If the MFP 1 determines that the screen displayed on the display unit 19 should be updated ("YES" in step S103), the processing shifts to step S105.

If the MFP 1 determines that it is not necessary to update the screen displayed on the display unit 19 ("No" in step S103), the processing shifts to step S113.

In step S105, the web-browser section 49 in the MFP 1 transmits, to the web-server section 161 in the server 101, a request message indicative of a request for web-page data for updating the screen displayed on the display unit 19.

Hereinafter, the flow of the processing which the server 101 executes on receiving the request message will be described while the description of the flow of the processing in the MFP 1 is interrupted.

Figure 9:
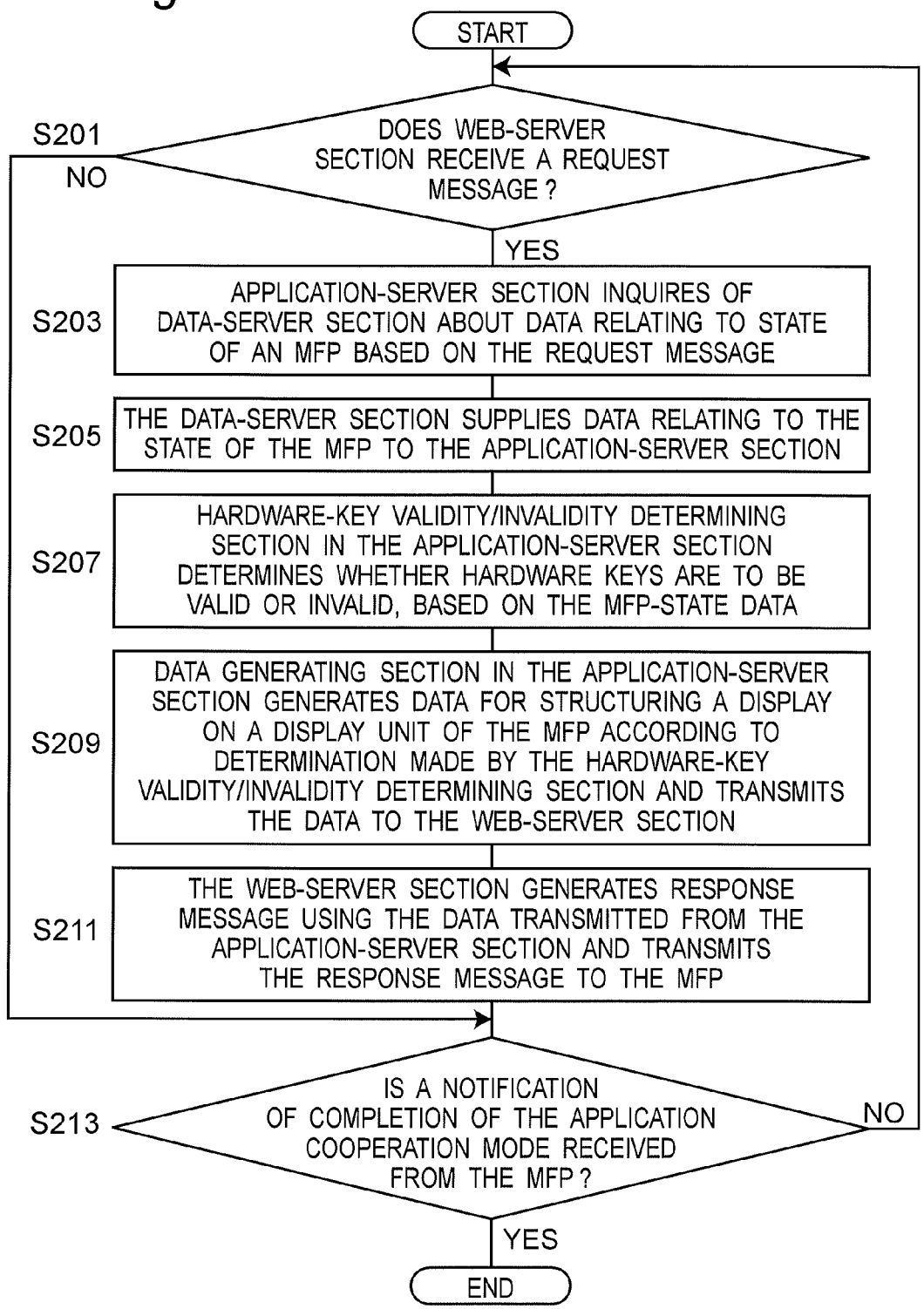
FIG. 9 is a flow chart of processing executed by the server.

FIG. 9 illustrates a flow chart illustrating the flow of the processing which the server 101 executes from a reception of the request message transmitted from the web-browser section 49 in the MFP 1 to a transmission of a response message in response to the message.

In step S201, the web-server section 161 in the server 101 determines whether or not it has received a request message.

If the web-server section 161 recognizes that it has received a request message ("YES" in step S201), the processing shifts to step S203.

If the web-server section 161 does not recognize that it has received a request message ("NO" in step S201), the processing shifts to step S213.

In step S203, the application-server section 171 in the server 101 makes a request of the data-server section 181 for an inquiry about data relating to the state of the MFP 1, based on the request message received by the web-server section 161.

In step S205, the data-server section 181 in the server 101 supplies, to the application-server section 171, data relating to the state of the MFP 1 (MFP-state data), in response to the request for an inquiry from the application-server section 171.

In step S207, the hardware-key validity/invalidity determining section 175 in the application-server section 171 determines the operations of the various types of the hardware keys 25 are to be valid or invalid, based on the MFP-state data supplied from the data-server section 181.

For example, the hardware-key validity/invalidity determining section 175 determines the operations on the hardware keys 25 are to be valid or invalid, in the following way. For example, it is assumed that the display unit 19 in the MFP 1 is displaying a screen for accepting a job for a FTP transmission of image data files. In this case, if no destination address for the FTP transmission has been inputted to the MFP 1 yet, the hardware-key validity/invalidity determining section 175 makes a reference to the MFP-state data to recognize that all information required for the FTP transmission has not been inputted to the MFP 1 yet. At this state, it is preferable that the operation for pushing the start key 25S (FIG. 3), which is one of the hardware keys 25, is made invalid. Accordingly, the hardware-key validity/invalidity determining section 175 determines the operation on the start key is to be invalid, based on the MFP-state data. The validity/invalidity of the operations on the other hardware keys are also determined, in the same way, based on the MFP-state data.

In step S209, the data generating section 173 in the application-server section 171 generates HTML data for use in structuring the display unit 19 in the MFP 1, according to the determination made by the hardware-key validity/invalidity determining section 175.

For example, the data generating section 173 can describe information about the types of the hardware keys and about the validity/invalidity of the operations on these keys, in a predetermined format, as comments, in the HTML data.

Also, the data generating section 173 can generate HTML data in such a way as to display software keys assigned the same functions as the functions assigned to the hardware keys 25 on the display unit 19. In this case, in creating descriptions about rendering relating to the display of these software keys in the HTML data, the data generating section 173 can make the condition of the display of the software keys, such as the colors of the displayed software keys, to be coincident with the hardware-key validity/invalidity determining section 175's determination about the hardware keys having the functions corresponding to these software keys.

For example, in the case where the operations on the hardware keys having the corresponding functions have been decided to be invalid, the data generating section 173 can generate descriptions about rendering relating to the display of the software keys in the HTML data in such a way as to display the corresponding software keys in a red color. In the case where the operations on the hardware keys having the corresponding functions have been decided to be valid, the data generating section 173 can generate descriptions about rendering relating to the display of these software keys in the HTML data in such a way as to display the corresponding software keys in a green color.

Then, the application-server section 171 transmits the created HTML data to the web-server section 161.

In step S211, the web-server section 161 structures web-page data using the HTML data generated by the application-server section 171 and transmits this data as a response message to the web-browser section 49 in the MFP 1.

In step S213, the server 101 determines whether or not it has received, from the MFP 1, a notification of the completion of an operation in the application cooperation mode.

If the server 101 determines that it has received the notification of the completion of an operation in the application cooperation mode ("YES" in step S213), the server 101 ends the processing.

If the server 101 determines that it has not received the notification of the completion of an operation in the application cooperation mode ("No" in step S213), the processing returns to step S201.

With reference again to FIG. 8, there will be described the processing after the time when the web-browser section 49 in the MFP 1 receives the response message.

In step S107, the web-browser section 49 in the MFP 1 generates screen image data constituting the display unit 19 and the software keys 23, using the web-page data received as a response message, and displays a screen of the display unit 19.

In step S109, the data analysis section 47 (FIG. 5) in the MFP 1 receives the web-page data and analyzes the data. The processing which is executed by the data analysis section 47 will be described in detail, with reference to a flow chart illustrated in FIG. 10.

Figure 10:
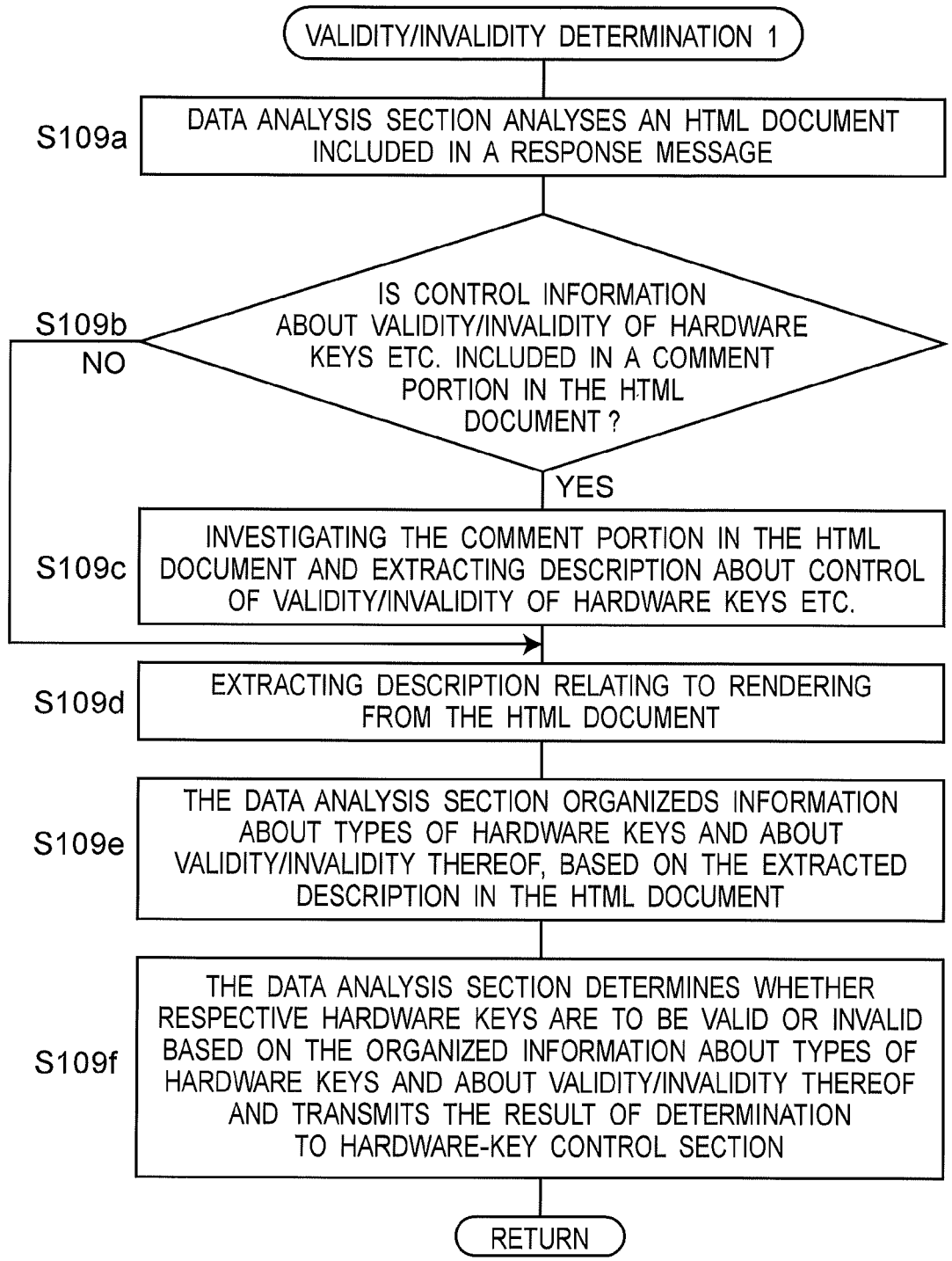
FIG. 10 is a flow chart of details of validity/invalidity determination processing 1.

Referring to FIG. 10, in step S109a, the data analysis section 47 performs analysis on the HTML data out of the web-page data included in the response message.

In step S109b, the data analysis section 47 searches for the comment portion of the HTML data (HTML document) and determines whether or not the descriptions in the comment portion include control information indicative of the validity/invalidity of the operations on the hardware keys, and the like, which is described in a predetermined format.

If the data analysis section 47 finds control information indicative of the validity/invalidity of the operations on the hardware keys, and the like, in the comment portion of the HTML data (HTML document) ("YES" in step S109b), the processing shifts to step S109c.

If the data analysis section 47 finds no control information indicative of the validity/invalidity of the operations on the hardware keys, and the like, in the comment portion of the HTML data (HTML document) ("NO" in step S109b), the processing shifts to step S109d by skipping step S109c.

In step S109c, the data analysis section 47 extracts, from the comment portion, the control information indicative of the validity/invalidity of the operations on the hardware keys and the like.

In step S109d, the data analysis section 47 searches for descriptions relating to rendering in the descriptions in the HTML data (HTML document) and extracts these descriptions therefrom.

Figures 11, 12:
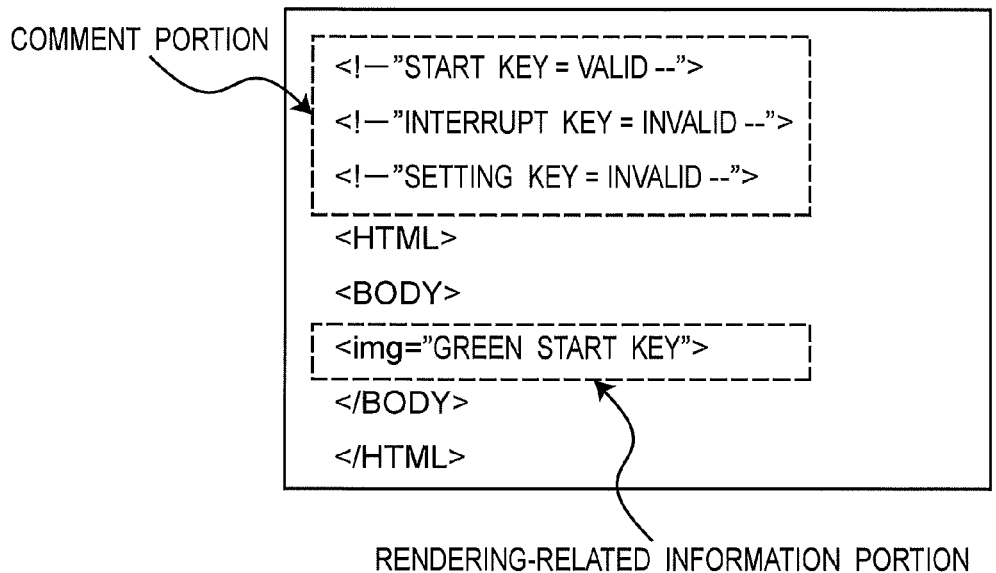
FIG. 11 is a diagram illustrating HTML data generated by the server.
FIG. 12 is a table illustrating the correspondence between descriptions of comments in the HTML data and the control of the validity/invalidity of the operation on the hardware key, which is performed by the image processing device.

FIG. 11 is a diagram illustrating an example of HTML data (an HTML document) which has been generated by the server 101 and then is transmitted therefrom to the MFP 1. Referring to FIG. 11, it can be seen that the HTML data includes both a comment portion and a rendering-related information portion. Further, in the embodiment of the present invention, HTML data is required only to include at least one of a comment portion and a rendering-related information portion.

In the comment portion, there is found a description of "(the type of a hardware key)=(valid or invalid)." In association with step S109c (FIG. 10), the data analysis section 47 extracts, from the descriptions in the comment portion, the information about the types of the hardware keys and about the control of the validity/invalidity of the operations on the keys.

In the rendering-related information portion, there is found an instruction for rendering a green start key. In association with step S109d (FIG. 10), the data analysis section 47 extracts such rendering-related information.

FIG. 12 is a table of an example illustrating the relationship between descriptions in the comment portion and the control of the validity/invalidity of the operations.

For example, if the comment portion includes a description of "Start key=valid," the MFP 1 performs control in such a way as to make the operation on the start key valid. Also, if the comment portion includes a description of "Interrupt key=invalid," the MFP 1 performs control in such a way as to make the operation on the interrupt key invalid.

FIG. 13 is a table illustrating an example of the relationship between descriptions relating to rendering and the control of the validity/invalidity of the operations.

For example, if there is a description indicating that the start key should be displayed in a green color, the MFP 1 may perform control in such a way as to make the operation on the start key valid. Alternatively, if there is a description indicating that the setting key should be displayed in a red color, the MFP 1 may perform control in such a way as to make the operation on the setting key invalid.

Here, the data analysis section 47 may analyze binary data such as image data included in the web-page data and may extract the characteristics of the image data so as to extract information required for the control of the validity/invalidity of the operations on the hardware keys.

Returning to FIG. 10, in step S109e, the data analysis section 47 organizes the information which associates the types of the hardware keys to be subjected to the control of the validity/invalidity of the operations with the information about the validity/invalidity thereof, based on the descriptions of the rendering-related information, and based on the descriptions of the comments extracted in step S109c.

In step S109f, the data analysis section 47 finally determines whether the operations on the respective hardware keys are valid or invalid, based on the information organized in step S109e and, then, transmits the result of the determination to the hardware-key control section 45 (FIG. 5).

Returning to FIG. 8, in step S111, the hardware-key control section 45 (FIG. 5) receives the result of the determination of the validity/invalidity of the operations on the hardware keys 25 from the data analysis section 47 and controls the validity/invalidity of the operations on the hardware keys 25 based on the result of the determination. The processing which is executed by the hardware-key control section 45 will be described in detail, with reference to a flow chart illustrated in FIG. 14.

Figure 14:
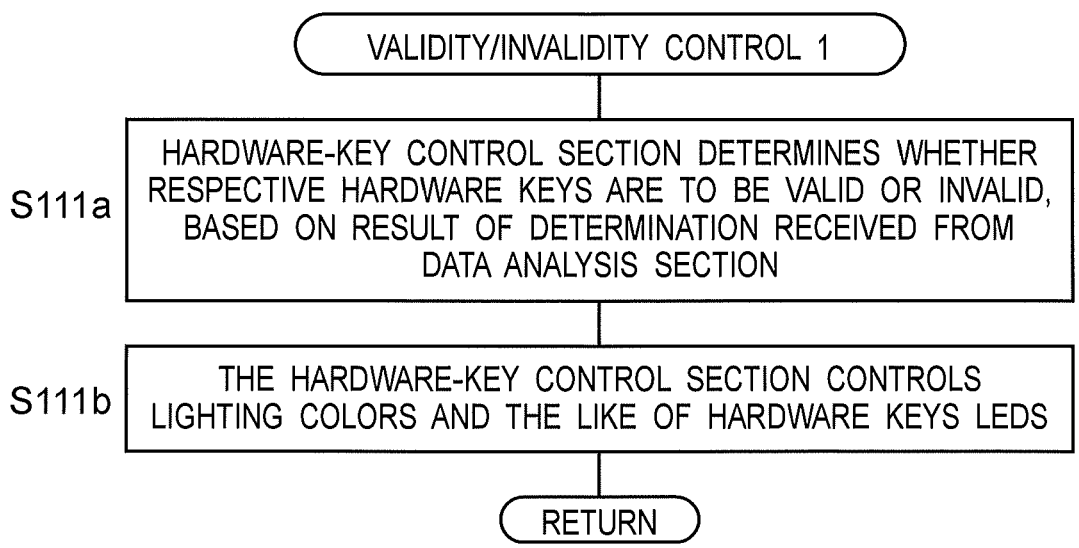
FIG. 14 is a flow chart of details of validity/invalidity control processing 1.

Referring to FIG. 14, in step S111a, the hardware-key control section 45 determines the operations on the respective hardware keys are valid or invalid, based on the result of the determination made by the data analysis section 47.

In step S111b, the hardware-key control section 45 controls the condition, the color and the like of the lighting of the LEDs (FIG. 3) in the hardware keys 25.

A reference is made to FIG. 8, again.

In step S113, the hardware-key control section 45 monitors whether or not any of the hardware keys 25 is pushed. If at least one of them is pushed ("YES" in step S113), the processing shifts to step S115. If none of the hardware keys 25 is pushed ("NO" in step S113), the processing shifts to step S117 by skipping step S115.

In step S115, the hardware-key control section 45 executes processing relating to pushing of the hardware keys. The processing in step S115 will be described in detail, with reference to a flow chart in FIG. 15.

Figure 15:
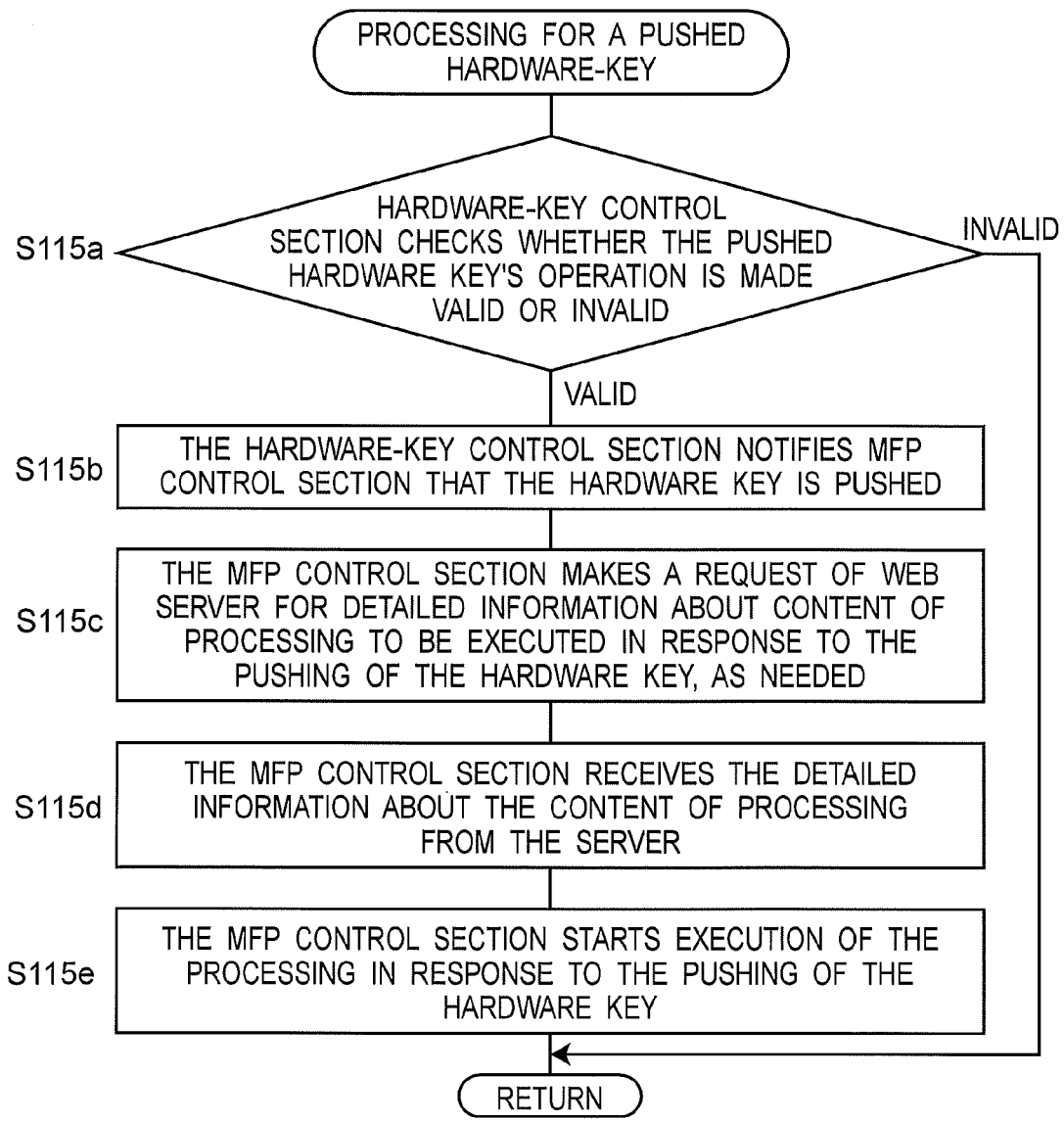
FIG. 15 is a flow chart of details of processing for a pushed hardware-key.

Referring to FIG. 15, in step S115a, the hardware-key control section 45 determines whether the operation on the pushed hardware key is valid or invalid.

If the hardware-key control section 45 determines that the operation on the pushed hardware key is valid ("valid" in step S115a), the processing shifts to step S115b.

If the hardware-key control section 45 determines that the operation on the pushed hardware key is invalid ("invalid" in step S115a), the processing in step S115 ends, and the processing shifts to step S117 (FIG. 8).

In step S115b, the hardware-key control section 45 notifies the MFP control section 41 (FIG. 5) that a valid hardware key 25 has been pushed.

In step S115c, the MFP control section 41 determines the function assigned to the pushed hardware key. If at least a part of information required for the execution of the assigned function is not held in the MFP 1 and, instead thereof, is held in the server 101 (the data-server section 181 therein), the MFP control section 41 can make a request of the server 101, through the web-browser section 49, for supply of the information required for the execution of the function assigned to the pushed hardware key.

In step S115d, the MFP control section 41 acquires, from the server 101, information about details of the content of the processing to be executed, as a response to the request made in step S115c.

In step S115e, the MFP control section 41 executes the function assigned to the pushed hardware key.

A reference is made to FIG. 8, again.

In step S117, the MFP 1 determines whether or not to finish the mode in which the MFP 1 operates as in the external-application cooperation mode.

If the MFP 1 determines to finish the mode in which it operates as in the external-application cooperation mode ("YES" in step S117), the processing shifts to step S119.

If the MFP 1 determines to continue the mode in which it operates as in the external-application cooperation mode ("NO" in step S117), the processing returns to step S103.

In step S119, the MFP 1 alters its operation mode to stand-alone operation mode and continues to performs its operations.

As described above, in the image processing device according to the first embodiment of the present invention, when the user interface unit 17 is caused to operate as a web-based user interface in cooperation with the server 101, the validity/invalidity of the operations on the hardware keys 25 in the input unit 21 in the user interface unit 17 is controlled based on web-page data transmitted from the web server. Therefore, in the image processing device according to the present embodiment, there is no need to have means for communication with the server 101 to acquire information other than the data for displaying a screen on the display unit 19 (web-page data) in order to control the validity/invalidity of the operations on the hardware keys 25 and the like. Further, in the image processing device according to the first embodiment, if any one of the hardware keys 25 is pushed, it is possible to determine whether the operation on the pushed hardware key is valid or invalid, without additionally inquiring of the server 101 thereabout. Further, if the operation on the pushed hardware key is invalid, it is possible to immediately cease the processing.

(First Variation of the Hardware-Key Pushing Processing)

Figure 16:
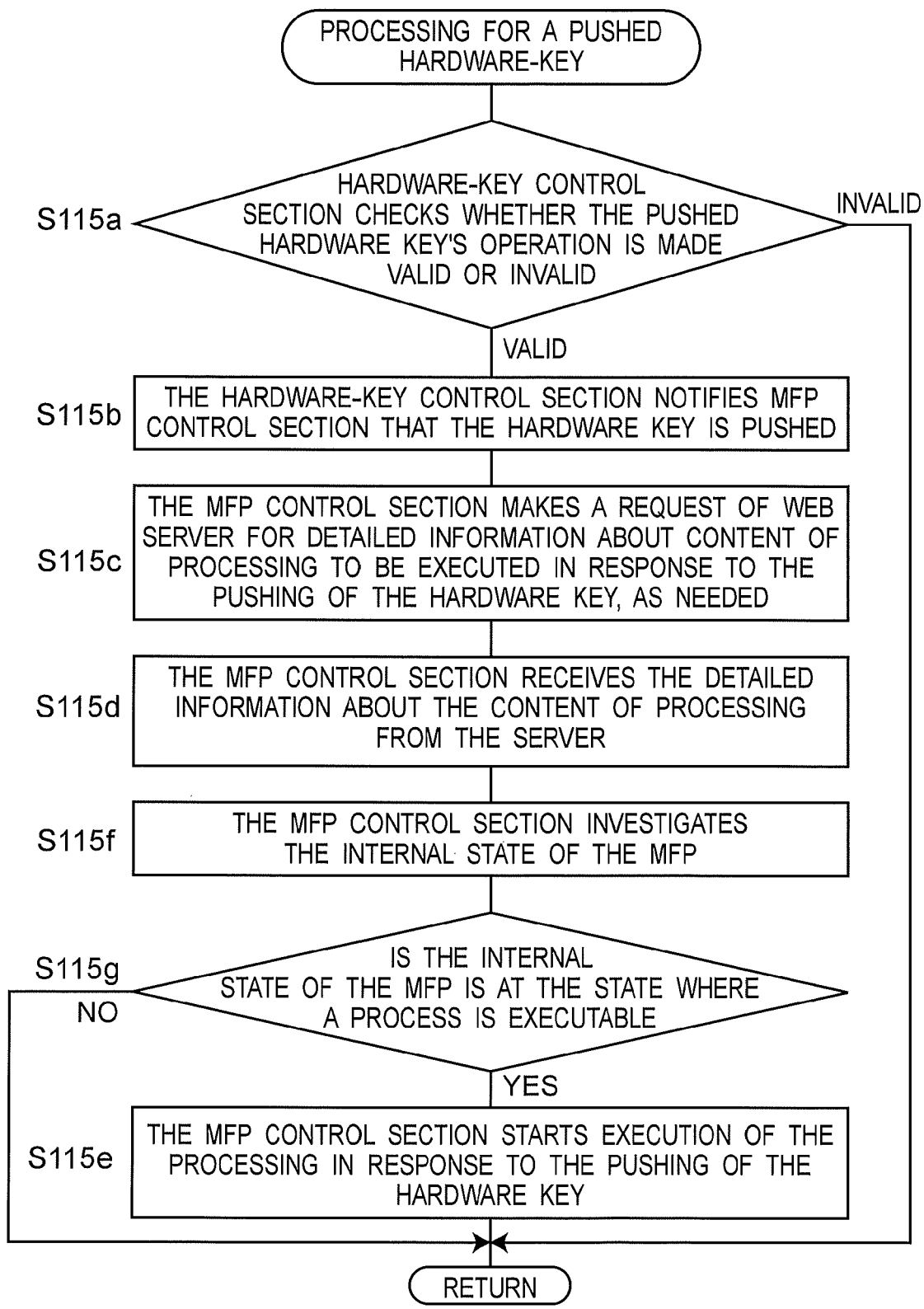
FIG. 16 is a flow chart of illustrating details of a variation of the processing for a pushed hardware-key.

FIG. 16 is a first variation of the hardware-key pushing processing illustrated in FIG. 15 (step S115 in FIG. 8). In the present first variation, if a hardware key 25 whose operation is valid is pushed, the MFP 1 (the MFP control section 41 therein) investigates the state of the inside of the MFP 1, before executing the function assigned to this key 25. Further, if the MFP 1 determines, from the result of the investigation of the state of the inside of the MFP 1, that there is a problem for the execution of the processing associated with this function, the MFP 1 makes the operation on the pushed hardware key 25 invalid and stops the execution of the function assigned to this key, in preference to the server 101's decision about the validity/invalidity of the operation on the hardware key 25. By doing this, the MFP 1 prevents the occurrence of accidents during the execution of functions, due to internally-induced malfunctions.

The steps S115a, S115b, S115c, S115d and S115e in FIG. 16 are the same as those in FIG. 15 and, therefore, will not be described herein.

In step S115f, the MFP control section 41 investigates the internal state of the MFP.

In step S115g, in taking account of the result of the investigation in step S115f and the content of the function assigned to the pushed hardware key 25, the MFP control section 41 determines whether or not the inside of the MFP is currently at a state which enables the execution of this function.

If the MFP control section 41 determines that the execution of this function is executable ("YES" in step S115g), the processing shifts to step S115e where the function assigned to the pushed hardware key 25 is executed.

If the MFP control section 41 determines that the execution of this function is not executable ("No" in step S115g), the processing ends by skipping step S115e.

As described above, in the present first variation, in preference to the server 101's decision about the validity/invalidity of the operations on the hardware keys, according to the state of the inside of the MFP 1, the MFP 1 can cease the execution of the function assigned to the pushed hardware key 25 by itself, which can prevent the occurrence of troubles due to the internal state of the MFP 1 while the function is executing. In other words, in the present first variation, the MFP 1 can be controlled, such that it executes the functions assigned to the hardware keys 25, only if both the server 101's decision about the validity/invalidity of the operations on the hardware keys 25 and the MFP 1's determination of the validity/invalidity of the operations on the hardware keys 25 based on the internal state of the MFP 1 indicate validity.

(Second Variation of Hardware-Key Pushing Processing)

In the first variation of the hardware-key pushing processing described with reference to FIG. 16, the MFP control section 41, on receiving a notification of the fact that a hardware key has been pushed from the hardware-key control section 45, determines whether or not the inside of the MFP 1 is at a state in which the processing to be executed in response to the pushing of the hardware key is executable (step S115$f$ and step S115$g$ in FIG. 16).

In addition or alternatively, the MFP control section 41 can determine whether or not the processing can be executed, based on the state of the inside of the MFP, before the hardware-key control section 45 notifies the MFP control section 41 of the fact that a hardware key has been pushed (step S115$b$ in FIG. 16). Furthermore, this determination can be made before any one of the hardware keys 25 is pushed. In short, this determination can be made independently of the timing when the hardware key 25 is pushed. As described above, in the second variation in which the determination is made as to whether or not the processing can be executed based on the internal state, when any one of the hardware keys 25 is pushed, the MFP 1 can employ the result of the determination as to whether or not the processing can be executed based on the internal state of the MFP 1, which is made at the timing being closest to the pushing (newest).

As described above, in the second variation of the hardware-key pushing processing, the MFP control section 41 can determine whether or not the processing can be executed at arbitrary timing, based on the internal state of the MFP 1. As for the timing, it is preferable that the determination as to whether or not the processing can be executed based on the internal state of the MFP 1 (step S115$f$ and step S115$g$ in FIG. 16) may be incorporated in the validity/invalidity determination 1 (step S109 in FIG. 8, and FIG. 10), for example. In this case, the hardware-key control section 45 can determine the hardware keys 25 are to be valid or invalid and, also, can control the color and the like of the lighting of the LEDs in the hardware keys 25, using the result of the MFP control section 41's determination as to whether or not the processing can be executed based on the internal state of the MFP 1 as well as the result of the validity/invalidity determination received from the data analysis section 47 (FIG. 5) (S111 in FIG. 8 and the validity/invalidity control 1 illustrated in FIG. 14).

Further, in a second embodiment described later, similarly, the determination as to whether or not the processing can be executed based on the internal state of the MFP 1 is preferably incorporated in the validity/invalidity determination 2 (step S309 in FIG. 19, and FIG. 21). In this case, the hardware-key control section 45 can determine the hardware keys 25 to be valid or invalid and, also, can control the color and the like of the lighting of the LEDs in the hardware keys 25, using the result of the MFP control section 41's determination as to whether or not the processing can be executed based on the internal state of the MFP 1 as well as the result of the validity/invalidity determination received from a determination procedure call-up section 53 (FIG. 17) (S311 in FIG. 19 and the validity/invalidity control 2 illustrated in FIG. 23).

(Second Embodiment)

Unlike the multifunction peripheral according to the first embodiment, a multifunction peripheral according to a second embodiment of the present invention is configured to directly make a request of a predetermined application included in a server for execution of processing for determining the operations on hardware keys are valid or invalid so that the multifunction peripheral can acquire the result of the execution of the application and control the validity/invalidity of the operations on the hardware keys based on the acquired result of the execution.

(The Structure of Image Processing System)

An image processing system according to the second embodiment of the present invention may have a similar structure to that described with reference to FIG. 1 in the description of the first embodiment.

(The Hardware Structure of MFP 1)

The MFP according to the second embodiment of the present invention may have a similar structure to that described with reference to FIGS. 2 and 3 in the description of the first embodiment.

(The Hardware Structure of Server 101)

A server according to the second embodiment of the present invention may have a similar structure to that described with reference to FIG. 4 in the description of the first embodiment.

(The Functional Structure of the MFP 1)

Figure 17:
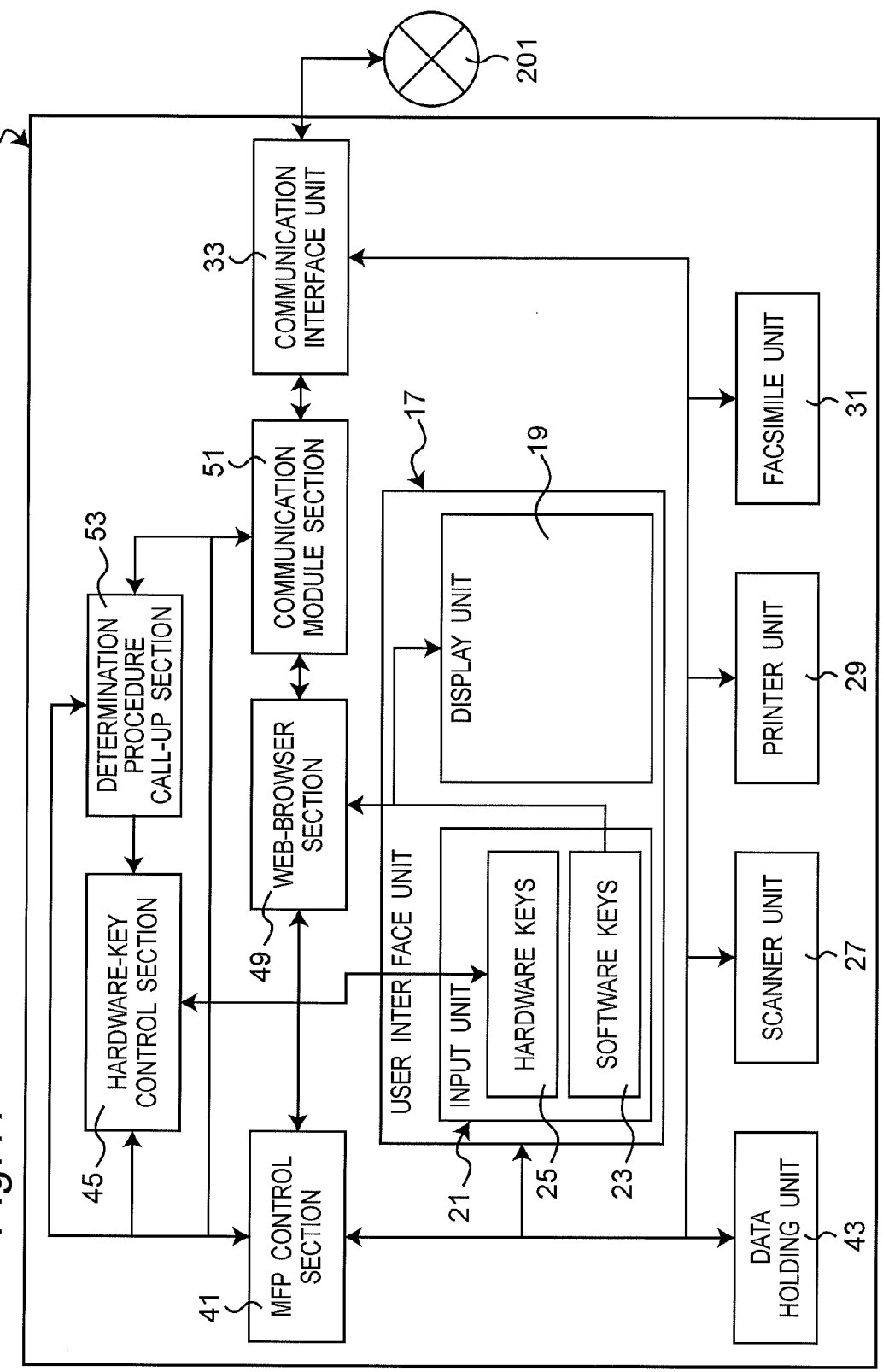
FIG. 17 is a block diagram of functional structure of an image processing device according to a second embodiment.

FIG. 17 is a block diagram of the functional structure of the MFP 1 according to the second embodiment of the present invention. The function blocks illustrated in FIG. 17 include functions which the computer main part 3 (FIG. 2) realizes by executing programs according to the embodiment of the present invention. In FIG. 17, the hardware elements and the functional elements illustrated in FIGS. 2 and 5 are designated by the same reference numerals as those in FIGS. 2 and 5.

Referring to FIG. 17, an MFP 1$ce$ according to the second embodiment is different from the MFP 1 according to the first embodiment, in that the MFP 1$ce$ includes a determination procedure call-up section 53 in place of the data analysis section 47 (FIG. 5).

The determination procedure call-up section 53 directly makes a request of an application included in a server 101$ce$, which will be described later, for execution of processing for determining the operations on hardware keys are to be valid or invalid. And the determination procedure call-up section 53 acquires the result of the execution of this application, generates data required for the hardware-key control section 45 to control the validity/invalidity of the operations on the hardware keys 25 ("the result of the validity/invalidity determination") based on the acquired result of the execution, and then supplies this data to the hardware-key control section 45 under the control of the MFP control section 41.

The MFP 1$ce$ according to the second embodiment can be regarded as being the same as the MFP 1 according to the first embodiment, except that the MFP 1$ce$ is provided with the determination procedure call-up section 53 in place of the data analysis section 47.

(The Functional Structure of the Server 101$ce$)

Figure 18:
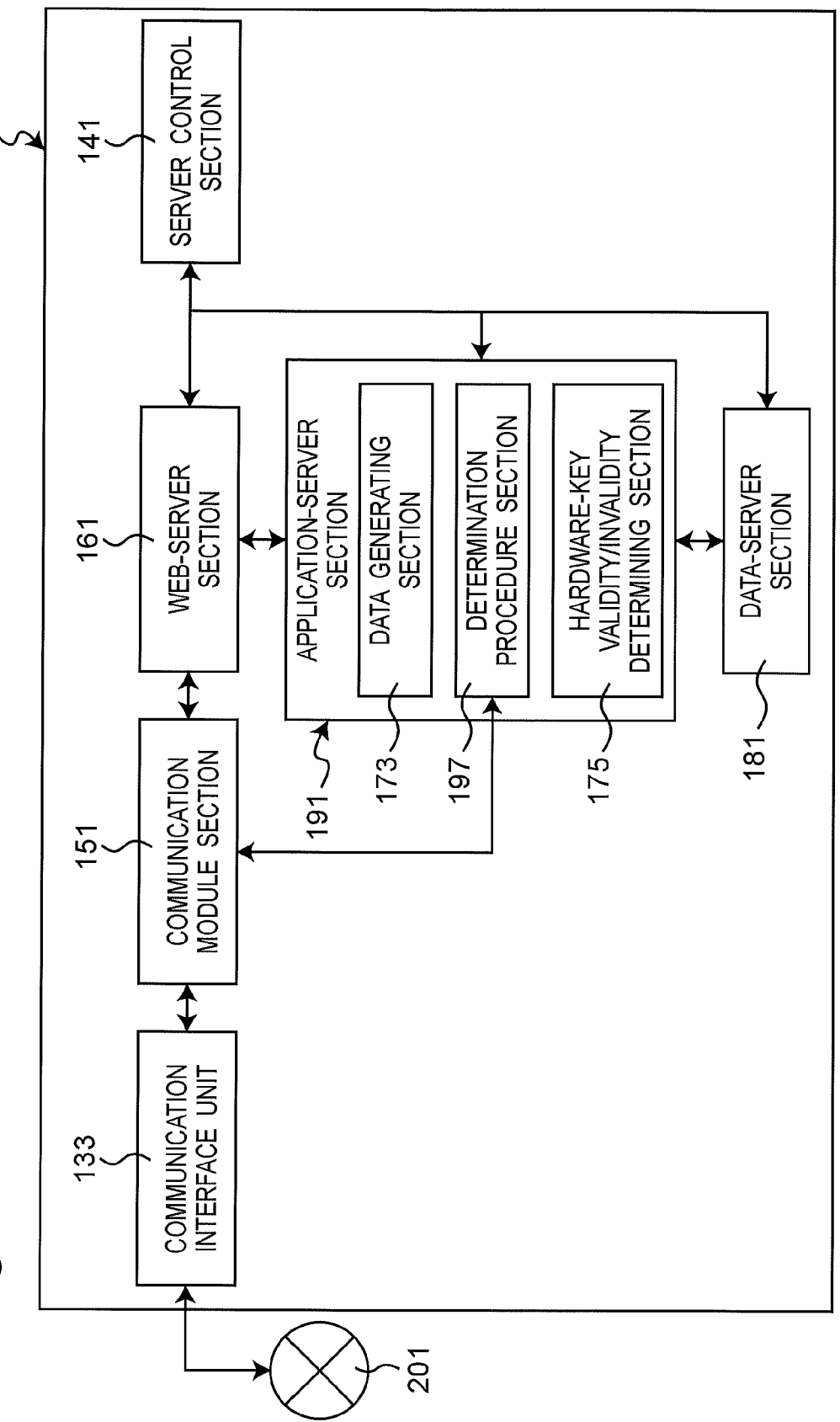
FIG. 18 is a block diagram of functional structure of a server according to the second embodiment.

FIG. 18 is a block diagram of the functional structure of the server 101$ce$ according to the second embodiment. The function blocks illustrated in FIG. 18 include functions which the computer main part 103 (FIG. 4) realizes by executing programs according to the embodiment of the present invention. In FIG. 18, the hardware elements and the functional elements illustrated in FIGS. 4 and 6 are designated by the same reference numerals as those in FIGS. 4 and 6.

The server 101$ce$ includes an application-server section 191, in place of the application-server section 171 (FIG. 6). The application-server section 191 includes a data generating section 173 and a hardware-key validity/invalidity determining section 175, similarly to the application-server section 171, and further includes a determination procedure section 197.

The determination procedure section 197 is connected to a communication module section 151 and can receive a request for execution directly from the determination procedure call-up section 53 in the MFP 1*ce*, according to a predetermined protocol (for example, SOAP). When receiving the request for the execution directly from the determination procedure call-up section 53, the determination procedure section 197 makes a request of the hardware-key validity/invalidity determining section 175 for inquiring of the data-server section 181 about data relating to the state of the multifunction peripheral 1 to determine the operations on the hardware keys 25 in the multifunction peripheral 1 are to be valid or invalid and, also, for transmitting the result of the determination to the determination procedure section 197. The determination procedure section 197 transmits the result of the determination to the determination procedure call-up section 53 in the MFP 1*ce*. The determination procedure call-up section 53 in the MFP 1*ce* creates a result of a validity/invalidity determination based on the received result of the determination and supplies this data to the hardware-key control section 45 in the MFP 1*ce*.

The server 101*ce* according to the second embodiment can be regarded as being the same as the server 101 according to the second embodiment, except that the server 101*ce* is further provided with the aforementioned determination procedure section 197 in the application-server section 171.

(The Flow of Processing)

Next, flows of processing in the MFP 1*ce* and the server 101*ce* will be described. A CPU 5 in the MFP 1*ce* or a CPU 105 in the server 101*ce* realizes the processing illustrated in the respective flow charts described later by executing programs stored in a main storage device or a secondary storage device thereof. FIGS. 19 and 20 illustrate portions of flow charts of processing in the MFP 1*ce* and the server 101*ce*, respectively. FIG. 19 is a flow chart of processing in the MFP 1*ce*, which corresponds to the flow chart of FIG. 8 referred in the description of the processing in the MFP 1 according to the first embodiment. FIG. 20 is a flow chart of processing in the server 101*ce*, which corresponds to the flow chart of FIG. 9 referred in the description of the processing in the server 101 according to the first embodiment. In the description regarding FIGS. 19 and 20 described later, common processing to those of FIGS. 8 and 9 are frequently not discussed when not necessary.

Figure 19:
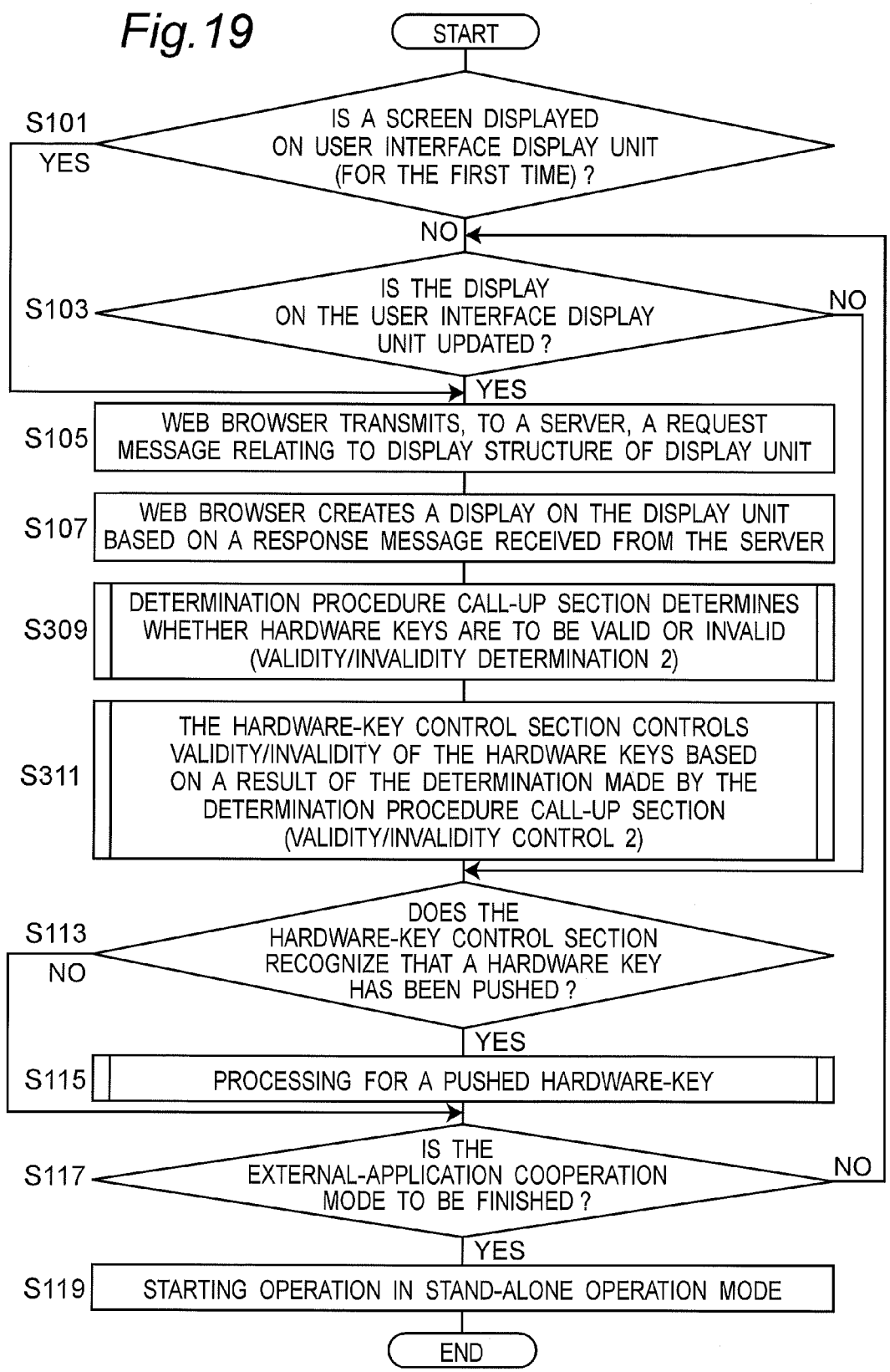
FIG. 19 is a flow chart of processing executed by the image processing device.
Figure 20:
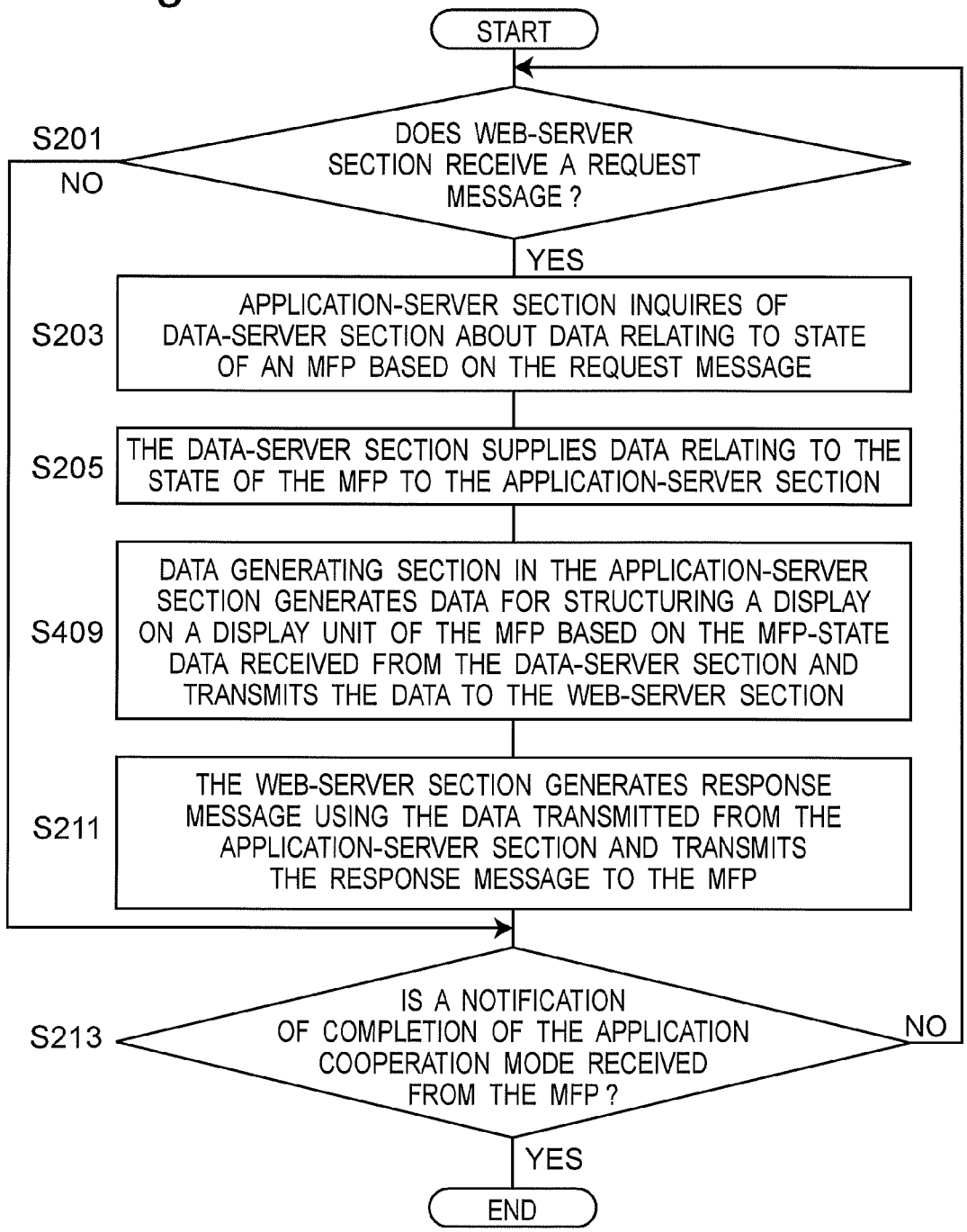
FIG. 20 is a flow chart of processing executed by the server.

At first, referring to FIG. 19, the MFP 1*ce* executes processing in steps S101, S103, S105 and S107 to create a screen data constituting a display unit 19 and software keys 23 using web-page data received as a response message and, then, displays a screen on the display unit 19, similarly to the MFP 1.

Next, FIG. 20 is referred with respect to the aforementioned steps S105 and S107.

Referring to FIG. 20, the server 101*ce* receives a request message in step S201, and the data generating section 173 in the application-server section 191 makes a request of the data-server section 181 for inquiry about data relating to the state of the MFP 1 in step S203, similarly to the server 101. Next, in step S205, the data-server section 181 in the server 101*ce* supplies the data relating to the state of the MFP 1 (the MFP-state data) to the application-server section 191, in response to the request for inquiry from the application-server section 191.

In step S409, the data generating section 173 in the application-server section 191 creates HTML data for use in the structuring of the display unit 19 in the MFP 1.

In the present embodiment, the data generating section 173 is not required to describe information in the HTML data about the types of the hardware keys and about the validity/invalidity of the operations on these keys in a predetermined format, as comments, unlike the data generating section 173 in the application-server section 191 in the server 101 according to the first embodiment.

The application-server section 191 transmits the generated HTML data to the web-server section 161.

In step S211, the web-server section 161 makes web-page data using the HTML data generated by the application-server section 191 and transmits the data to the web-browser section 49 in the MFP 1*ce*, as a response message.

A reference is made to FIG. 19, again.

In step S309, the determination procedure call-up section 53 transmits a message according to the SOAP to the determination procedure section 197 in the server 101*ce*, acquires the result of execution from the determination procedure section 197, and determines, based on the acquired result of execution, whether the operations on the hardware keys are valid or invalid. The determination procedure call-up section 53 supplies the result of the validity/invalidity determination to the hardware-key control section 45 similarly to in the first embodiment.

Figure 21:
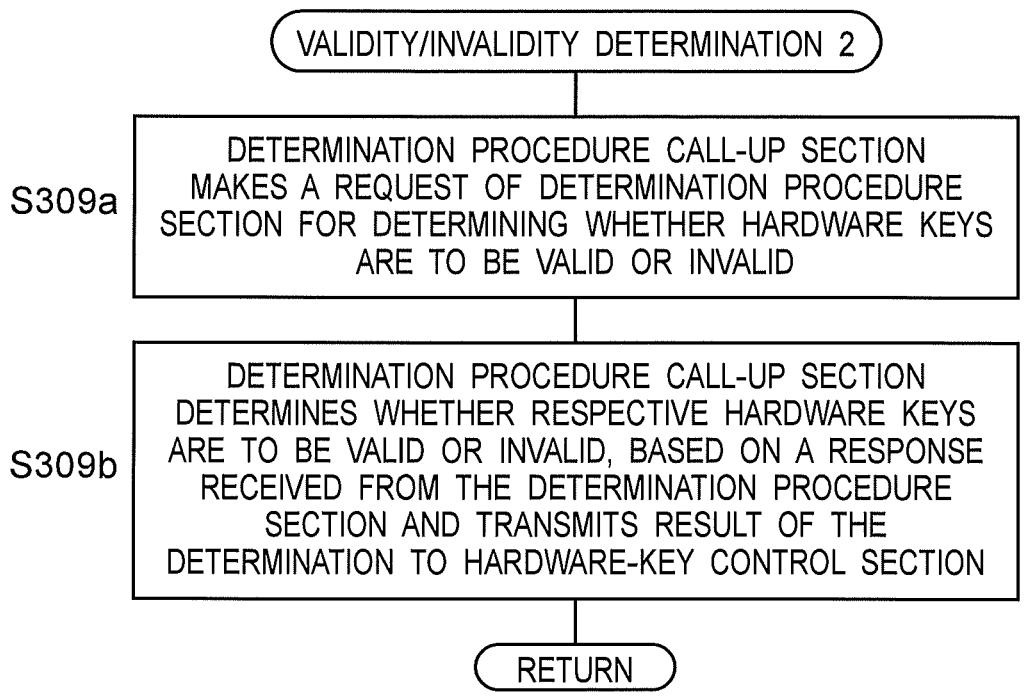
FIG. 21 is a flow chart of details of validity/invalidity determination processing 2.

FIG. 21 is a flow chart illustrating details of the processing in step S309 (FIG. 19).

Referring to FIG. 21, in step S309*a*, the determination procedure call-up section 53 makes a request of the determination procedure section 197 in the server 101*ce* for execution of determination as to whether the hardware keys are to be valid or invalid.

In step S309*b*, the determination procedure call-up section 53, based on the response received from the determination procedure section 197, determines the operations on the hardware keys are valid or invalid and transmits the result of the validity/invalidity determination to the hardware-key control section 45.

Figure 22:
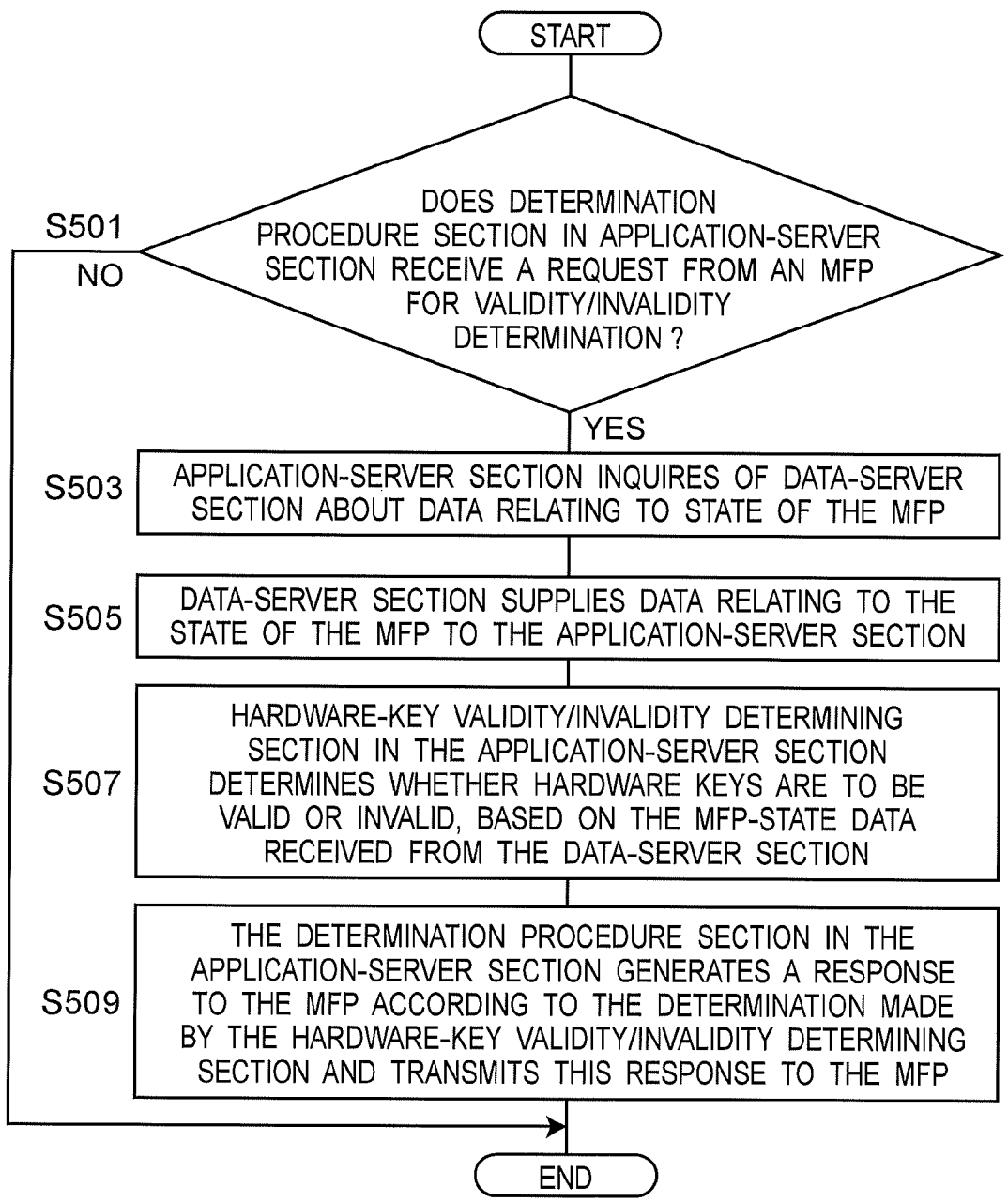
FIG. 22 is a flow chart of processing executed by the server.

FIG. 22 is a flow chart illustrating the flow of the processing in the server 101*ce* executed when the determination procedure call-up section 53 makes a request of the determination procedure section 197 in the server 101*ce* for execution of determination as to whether the hardware keys are to be valid or invalid, in step S309*a*.

Referring to FIG. 22, in step S501, the determination procedure section 197 determines whether or not the section 197 has received a request for execution of the validity/invalidity determination.

If the determination procedure section 197 recognized that the request for execution of the validity/invalidity determination has been received ("YES" in step S501), the processing shifts to step S503.

If the determination procedure section 197 recognized that no request for execution of the validity/invalidity determination has been received ("NO" in step S501), the processing ends.

In step S503, the hardware-key validity/invalidity determining section 175 (FIG. 18) in the application-server section 191 makes a request of the data-server section 181 for inquiry about data relating to the state of the MFP 1.

In step S505, the data-server section 181 supplies, to the hardware-key validity/invalidity determining section 175, the data relating to the state of the MFP 1 (the MFP-state data), in response to the request for inquiry from the hardware-key validity/invalidity determining section 175.

In step S507, the hardware-key validity/invalidity determining section 175 determines the operations on the various types of the hardware keys 25 are to be valid or invalid based on the MFP-state data supplied from the data-server section 181.

In step 5509, the determination procedure section 197 receives the determination of the validity/invalidity of the operations on the hardware keys 25 made by the hardware-key validity/invalidity determining section 175, and transmits the content of the determination to the determination procedure call-up section 53 in the MFP 1ce.

A reference is made to FIG. 19, again.

In step S311, the hardware-key control section 45 controls the validity/invalidity of the operations on the hardware keys 25 based on the result of the validity/invalidity determination received from the determination procedure call-up section 53. The processing executed by the hardware-key control section 45 will be described in detail, with reference to a flow chart illustrated in FIG. 23.

Figure 23:
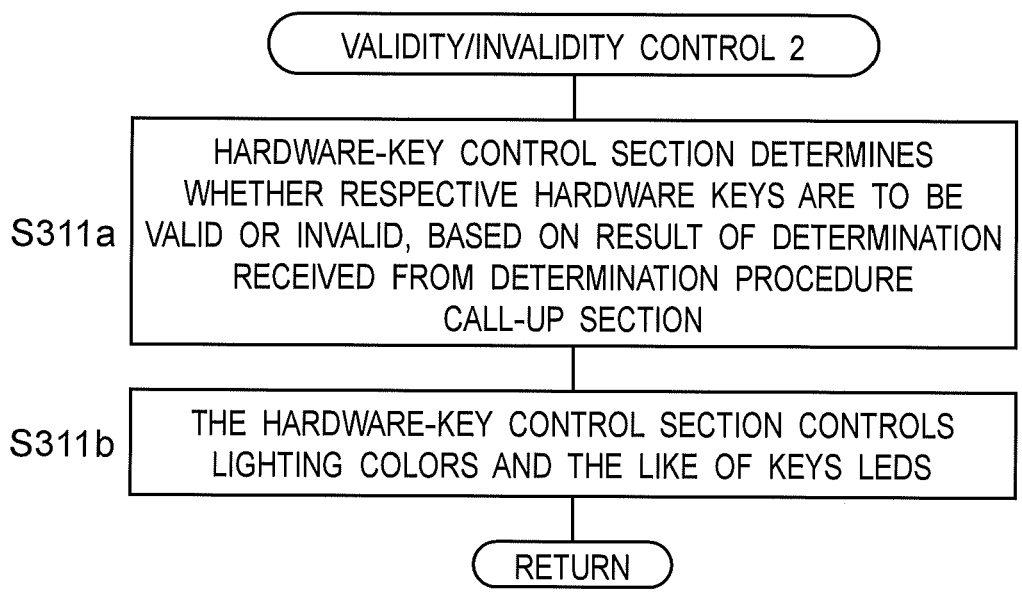
FIG. 23 is a flow chart of details of validity/invalidity control processing 2.

Referring to FIG. 23, in step S311a, the hardware-key control section 45 determines the operations on the respective hardware keys are valid or invalid based on the result of the determination made by the determination procedure call-up section 53, and, in step S311b, the hardware-key control section 45 controls the lighting modes, colors, and the like of the LEDs in the hardware keys 25 (FIG. 3).

A reference is made to FIG. 19, again.

In step S113, the hardware-key control section 45 monitors whether any one of the hardware keys 25 is pushed or not. If any one of them is pushed ("YES" in step S113), the processing shifts to step S115. If none of the hardware keys 25 is pushed ("NO" in step S113), the processing shifts to step S117 by skipping step S115. The processing in steps S115, S117 and S119 can be the same as the processing in the MFP 1 according to the first embodiment.

As described above, in the image processing device according to the second embodiment of the present invention, it is possible to control the validity/invalidity of the operations on the hardware keys 25 in the input unit 21 in the user interface unit 17, by directly inquiring of an application included in the server 101ce thereabout. In the image processing device according to the present embodiment, it is also possible to control the validity/invalidity of the operations on the hardware keys according to the state of the image processing device, equally immediate to the image processing device according to the first embodiment.

(Variation of the Server Structure)

FIG. 24 is a block diagram illustrating a functional structure of a variation of the MFP 1 according to the first embodiment of the present invention.

The present variation MFP 1v has the functions of the server 101 (FIG. 6) inside thereof. A server module 99 is a module realized by a program which is executed by a computer main part 3 (FIG. 2) in the MFP 1v. The server module 99 is connected to the communication module 51 and can transmit and receive data to and from the respective function blocks (for example, a web-browser section 49 and a data analysis section 47) in the MFP 1v through the communication module 51.

The MFP 1v can operate solely without being connected to the server 101. Further, the server module 99 can be internally implemented as an architecture separated from the original and essential functional blocks in the MFP 1v, which enables updating the functions thereof more easily than in conventional image processing devices.

The present variation is a variation of the MFP 1 according to the first embodiment, but the server module can be also implemented within the MFP 1ce according to the second embodiment, similarly. In this case, the server module may have similar functions to those of the server 101ce.

In the present invention, the web browser refers to a function of acquiring documents described in a markup language and then forming a display screen based on the documents. Such a markup language may include the HTML, but is not limited thereto.

The user interface display unit is not limited to a device capable of supplying information to the user through the user's visual perception. The user interface includes a device capable of supplying information to the user by outputting sound and the like.

The user interface input unit is not limited to a device capable of receiving an input of information from the user by sensing a user's contact with the input unit. The user interface includes a non-contact type information input device.

The embodiments of the present invention relates to an image processing device and a server device. The embodiments of the present invention have the advantage that the user interface can be more easily designing, changing and the like.

What is claimed is:

1. An image processing device, comprising:
a communication interface unit;
a user interface display unit which provides information to a user;
a user interface input unit including a hardware key which is arranged to receive an input from the user;
a web-browser section which is arranged to receive page data from a server including a web server, structure a display screen image on said user interface display unit based on the page data, and display the display screen on said user interface display unit;
a determination section which is arranged to determine whether a function assigned to said hardware key is executable or not based on content of the function assigned to said hardware key and a result of an investigation of a state of the image processing device;
a data analysis section which is arranged to determine whether operability of said hardware key is to be valid or invalid based on the page data; and
a hardware-key control section which is arranged to invalidate the operability of said hardware key regardless of a determination made by the data analysis section in the case that the determination made by the determination section indicates that the function assigned to said hardware key is not executable, and to validate the operation on said hardware key in the case that the determination made by the data analysis section indicates that the operability of the hardware key is valid and the determination made by the determination section indicates that the function assigned to said hardware key is executable.

2. The image processing device according to claim 1, wherein:
the page data includes text data described in a markup language; and
said data analysis section determines whether operability of the hardware key is valid or invalid based on description in the text data.

3. The image processing device according to claim 2, wherein said data analysis section determines whether operability of the hardware key is valid or invalid based on description in a comment portion in the text data.

4. The image processing device according to claim 2, wherein said data analysis section determines whether operability of the hardware key is valid or invalid based on description in a rendering-related information portion in the text data.

5. The image processing device according to claim 4, wherein:

the rendering-related information portion in the text data includes description relating to rendering of a software key which is assigned a function corresponding to a function assigned to the hardware key and is displayed in said user interface display unit;

said data analysis section determines whether operability of the hardware key which is assigned the function corresponding to the function assigned to the software key is valid or invalid based on description relating to rendering of the software key; and said hardware-key control section controls the validity/invalidity of operability of the hardware key which is assigned the function corresponding to the function assigned to the software key based on the determination made by said data analysis section and said determination section.

6. The image processing device according to claim 5, wherein:

the description relating to the rendering of the software key includes description about a name of the software key and about a display color of the software key;

said data analysis section determines whether operability of the hardware key which is assigned the function corresponding to the function assigned to the software key is valid or invalid based on the description about the name of the software key and about the display color of the software key; and said hardware-key control section controls the validity/invalidity of operability of the hardware key which is assigned the function corresponding to the function assigned to the software key based on the determination made by said data analysis section and said determination section.

7. The image processing device according to claim 1, wherein:

said user interface input unit includes a start key as the hardware key, which is arranged to receive an instruction to execute a job;

said data analysis section determines whether operability of the start key is valid or invalid based on the page data; and said hardware-key control section controls the validity/invalidity of operability of the start key based on the determination made by said data analysis section and said determination section.

8. The image processing device according to claim 5, wherein:

the start key includes an indicator which is arranged to notify the user whether operability thereof is valid or invalid; and said hardware-key control section controls the indicator of the start key based on the determination made by said data analysis section and said determination section.

9. The image processing device according to claim 1, further comprising a control section, wherein:

when a hardware key whose operability has been made valid is pushed, said control section investigates the internal state of the image processing device before the execution of the function assigned to the pushed hardware key; and if said control section determines, based on the result of the investigation, that the function assigned to the pushed hardware key is not executable, said control section makes the pushing operation of the pushed hardware key, of whose operation has been made valid, to be invalid.

10. A non-transitory computer-readable medium storing a program being executed on a computer of an image processing device, the program comprising:

code that causes the computer to perform a web-browser function to receive page data from a server including a web server through a communication interface unit of the image processing device, structure a display screen image on a user interface display unit of the image processing device based on the page data and display the display screen on the user interface display unit, the user interface display unit being arranged to provide information to a user;

code that causes the computer to perform a determination function to determine whether a function assigned to said hardware key is executable or not based on content of the function assigned to said hardware key and a result of an investigation of a state of the image processing device;

code that causes the computer to perform a data analysis function to determine whether operability of a hardware key of a user interface input unit of the image processing device is to be valid or invalid based on the page data, the user interface input unit being arranged to receive an input from the user;

code that causes the computer to perform a hardware-key control function to invalidate the operability of the hardware key regardless of a determination made by the data analysis function in the case that the determination made by the determination function indicates that the function assigned to said hardware key is not executable, and to validate the operation on said hardware key in the case that the determination made by the data analysis function indicates that the operability of the hardware key is valid and the determination made by the determination function indicates that the function assigned to said hardware key is executable.

11. The non-transitory computer-readable medium according to claim 10, wherein:

the page data includes text data described in a markup language; and said data analysis function determines whether operability of the hardware key is valid or invalid based on description in the text data.

12. The non-transitory computer-readable medium according to claim 11, wherein said data analysis function determines whether operability of the hardware key is valid or invalid based on description in a comment portion in the text data.

13. The non-transitory computer-readable medium according to claim 11, wherein said data analysis function determines whether operability of the hardware key is valid or invalid based on description in a rendering-related information portion in the text data.

14. The non-transitory computer-readable medium according to claim 13, wherein:

the rendering-related information portion in the text data includes description relating to rendering of a software key which is assigned a function corresponding to a function assigned to the hardware key and is displayed in the user interface display unit;

said data analysis function determines whether operability of the hardware key which is assigned the function corresponding to the function assigned to the software key is valid or invalid based on description relating to rendering of the software key; and said hardware-key control function controls the validity/invalidity of operability of the hardware key which is assigned the function corresponding to the function assigned to the software key based on the determination made by said data analysis function and said determination function.

15. The non-transitory computer-readable medium according to claim 14, wherein:
the description relating to the rendering of the software key includes description about a name of the software key and about a display color of the software key;
said data analysis function determines whether operability of the hardware key which is assigned the function corresponding to the function assigned to the software key is valid or invalid based on the description about the name of the software key and about the display color of the software key; and
said hardware-key control function controls the validity/ invalidity of operability of the hardware key which is assigned the function corresponding to the function assigned to the software key based on the determination made by said data analysis function and said determination function.

16. The non-transitory computer-readable medium according to claim 10, wherein:
the user interface input unit of the image processing device includes a start key as the hardware key, which is arranged to receive an instruction to execute a job;
said data analysis function determines whether operability of the start key is valid or invalid based on the page data; and
said hardware-key control function controls the validity/ invalidity of operability of the start key based on the determination made by said data analysis function and said determination function.

17. The non-transitory computer-readable medium according to claim 14, wherein:
the start key of the image processing device includes an indicator which is arranged to notify the user whether operability thereof is valid or invalid; and
said hardware-key control function controls the indicator of the start key based on the determination made by said data analysis function and said determination function.

18. The non-transitory computer-readable medium according to claim 10, the program further comprising code that causes the computer to perform a control function, wherein:
when a hardware key whose operability has been made valid is pushed, said control function investigates the internal state of the image processing device before the execution of the function assigned to the pushed hardware key; and
if said control function determines, based on the result of the investigation, that the function assigned to the pushed hardware key is not executable, said control function makes the pushing operation of the pushed hardware key, of whose operation has been made valid, to be invalid.

\* \* \* \* \*